United States Patent [19]
van den Brandt et al.

[11] Patent Number: 5,098,184
[45] Date of Patent: Mar. 24, 1992

[54] OPTICAL ILLUMINATION SYSTEM AND PROJECTION APPARATUS COMPRISING SUCH A SYSTEM

[75] Inventors: Adrianus H. J. van den Brandt; Wilhelmus A. G. Timmers, both of Eindhoven, Netherlands

[73] Assignee: U.S. Philips Corporation, New York, N.Y.

[21] Appl. No.: 516,891

[22] Filed: Apr. 30, 1990

[30] Foreign Application Priority Data

Apr. 28, 1989 [NL] Netherlands ............... 8901077

[51] Int. Cl.[5] .................................. G03B 21/20
[52] U.S. Cl. ............................. 353/102; 353/31; 353/38; 362/309; 359/622
[58] Field of Search ............ 362/268, 309, 308, 307; 350/167; 353/38, 31, 102, 32

[56] References Cited

U.S. PATENT DOCUMENTS

| | | | |
|---|---|---|---|
| 2,326,970 | 8/1943 | Rautsch | 353/38 |
| 3,166,625 | 1/1965 | Brumley | 353/38 |
| 3,267,802 | 8/1966 | Noble | 362/268 |
| 3,296,923 | 1/1967 | Miles | 350/167 |
| 3,555,987 | 1/1971 | Browning | 350/167 |
| 3,941,475 | 3/1976 | Sheets | 362/268 |
| 4,626,082 | 12/1986 | Mochizuki et al. | 350/167 |

Primary Examiner—William A. Cuchlinski, Jr.
Assistant Examiner—William C. Dowling
Attorney, Agent, or Firm—Norman N. Spain

[57] ABSTRACT

An efficient illumination system for an image projection apparatus is described, which system comprises a radiation source (20), a concave reflector (21) and a first and a second lens plate (25, 28) each being provided with a matrix of lenses (26, 29) for forming superimposed images of the radiation source on the object (1) to be illuminated, the aspect ratio of the lenses (26, 29) corresponding to that of the object (1).

35 Claims, 11 Drawing Sheets

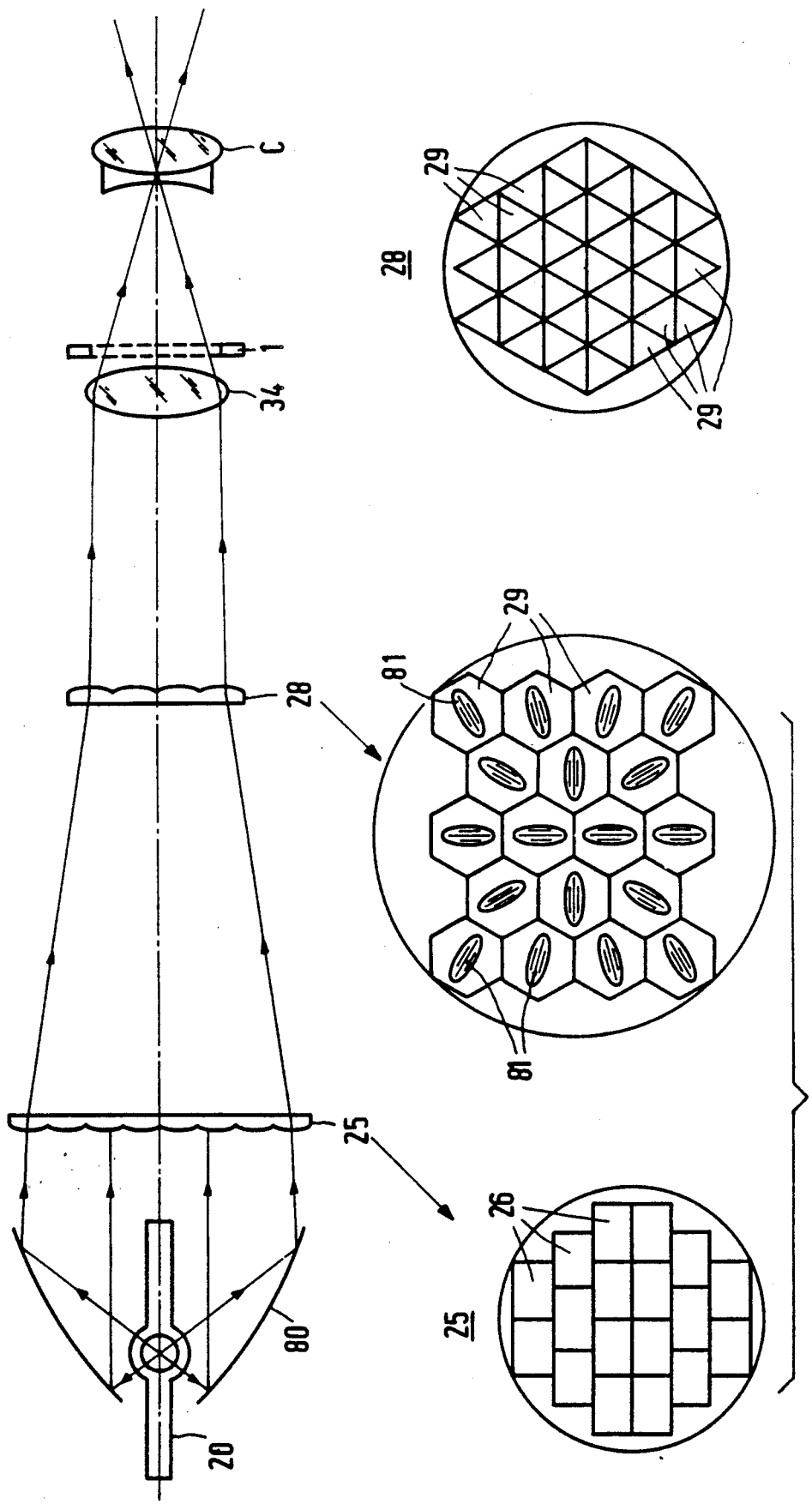

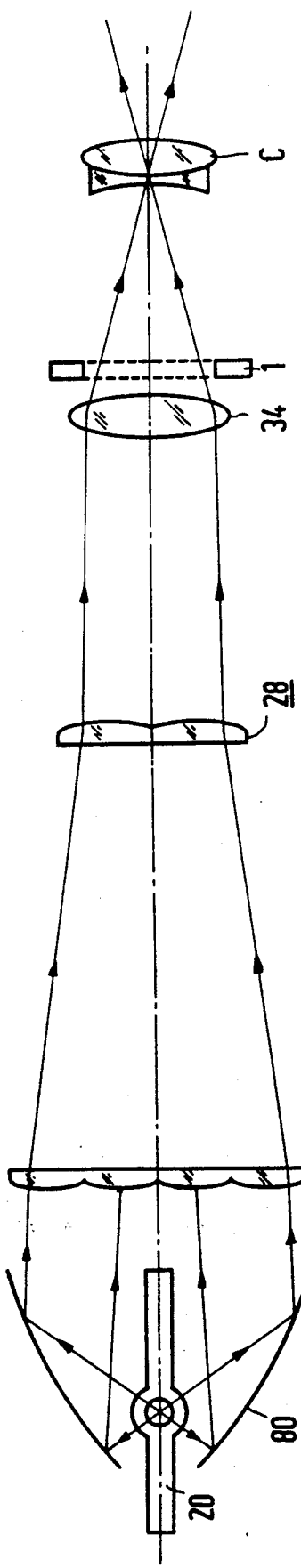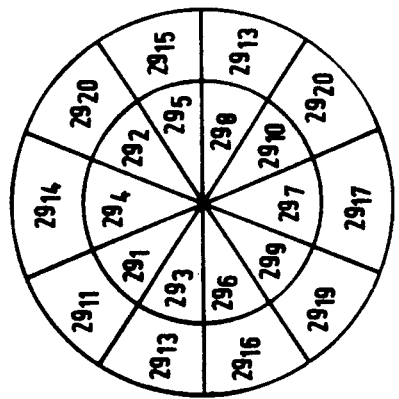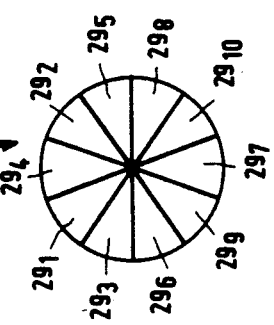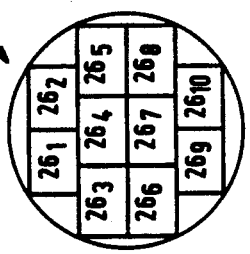
FIG.29
FIG.30
FIG.31

OPTICAL ILLUMINATION SYSTEM AND PROJECTION APPARATUS COMPRISING SUCH A SYSTEM

BACKGROUND OF THE INVENTION

1. Field of the Invention

The invention relates to an illumination system for supplying an optical radiation beam along a principal axis and intended for illuminating an object which, in a plane perpendicular to the principal axis, has a non-round cross-section, said system comprising a radiation source, a concave reflector for concentrating radiation emitted by the radiation source and a lens system arranged in the path of the concentrated radiation. The invention also relates to an image projection apparatus comprising such an illumination system for illuminating at least one image display panel by means of which an image is generated which is projected on a projection screen via a projection lens system.

2. Description of the Related Art

The term image projection apparatus is herein used in its widest sense and comprises a device for displaying, for example, a video image, a graphic image, numerical information or a combination thereof. The image may be both a monochrome image and a color image. In the latter case the display system may comprise three color channels for, for example, the primary colors red, green and blue, each channel comprising a display panel. A monochrome image is understood to mean an image having only one color which in principle corresponds to a specific wavelength and in practice to a wavelength band around this specific, central wavelength. Such an image may be formed by a so-called monochromatic beam having a central wavelength and possibly a wavelength band surrounding it. The projection screen may be a transmission screen which may form part of the apparatus and close this apparatus at one side. It is alternatively possible for the screen to be arranged at some distance from the apparatus and it may be a reflecting screen in the form of, for example, a wall having a suitable reflection.

European Patent Application No. 0,293,007 describes a projection television apparatus in which an illumination system is used for illuminating a liquid crystal display panel. In the known illumination system the reflector is a parabolic reflector which encloses the radiation source through an angle of more than 180° so that the radiation which is not directed towards the display panel is largely captured and as yet reflected to the display panel. When used in transmission a liquid crystal display panel has a low efficiency: for example, only 10% of the radiation incident on the panel is passed to the projection lens system. Moreover, this system projects the panel in a magnified form so that the illumination beam must have a large intensity if the radiation intensity per surface area unit on the screen is still to be sufficient. Since a projection television apparatus is a consumer apparatus which should be compact and inexpensive and have a construction which is as simple as possible, inter alia a simple cooling of the radiation source should suffice thus the radiation energy of the source should be limited and this energy should be used as efficiently as possible.

An important aspect is that the combination of radiation source and parabolic reflector supplies a parallel beam with a round cross-section, whereas the display panel is rectangular having a width (b)-height (h) ratio (aspect ratio) of, for example 4:3. For a complete illumination of the display panel the cross-section of the round beam at the location of the panel should have a diameter $$d = \sqrt{b^2 + h^2}$$

and the center of the beam should coincide with the center of the display panel. The portions of the illumination beam outside the rectangle of the display panel are blocked and cannot be used for projecting the panel on the projection screen. To make better use of the available radiation, a transparent plate whose side facing the radiation source has a so-called linear Fresnel lens structure is arranged between the radiation source and the display panel in a first embodiment of a device according to European Patent Application No. 0,239,007. This structure comprises a plurality of cylindrical lenses whose longitudinal direction is parallel to the width direction of the display panel. The cylindrical lenses converge the beam in the direction of height of the panel so that in this direction more radiation passes through the panel. A second similar plate may be arranged in the radiation path behind the first Fresnel plate so as to cause the beam to be incident on the display panel as a parallel beam. In this embodiment the beam cross-section in the width direction of the display panel is not adapted, which results in a given quantity of radiation being lost in this direction. Moreover, since the beam supplied by the radiation source has a larger light intensity in the center than at the edge, the illumination intensity distribution on the display panel will not be uniform.

In a second embodiment of the illumination system according to European Patent Application 0,239,007 a more uniform distribution of radiation is realized because two circular Fresnel lens structures are used instead of the two linear Fresnel lens structures covering the complete plate surface areas. These circular Fresnel lens structures only cover an annular region of the plates. The first Fresnel lens structure converges the peripheral portion of the beam and the second Fresnel lens structure ensures that this peripheral portion will be parallel to the central portion of the beam which is not influenced by the plates.

SUMMARY OF THE INVENTION

The present invention relates to a different concept of an illumination system, notably for a rectangular or other non-circularly symmetrical display panel, in which illumination system a maximum quantity of the radiation supplied by the source is directed onto the display panel and in which the illumination beam at the position of the object to be illuminated, has a cross section adapted to this object and a radiation distribution which is uniform to a great extent.

The invention provides different embodiments of the illumination system which are commonly characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses and a third lens, the first lens plate dividing a radiation beam incident thereon into a number of sub-beams proportional to the number of first lenses, which sub-beams have their smallest constriction in the plane of the second lenses and whose chief rays are directed towards the centers of the corresponding second lenses, in that the lens together with the second lens plate images the radiation spots formed on the first lens plate in a superimposed form on the object, and in that the width/height ratio of the first lenses corresponds to said ratio of the object cross-section.

Since the aspect ratio of the lenses of the first lens plate is equal to that of the object, and because these lenses are imaged onto the object, the shape of the cross-section of the illuminating beam at the object is adapted to the shape of the object, such that substantially all radiation incident on the first lens plate reaches the object. Since the radiation spots formed on the lenses of the first plate are projected in a superimposed form on the object by means of the second lens plates and the lens arranged behind this plate, the radiation distribution of the beam at the location of the object has the desired extent of uniformity.

It is to be noted that an image projection apparatus is described in German Patent Specification No. 1,144,498, in which apparatus two lens plates are arranged in the path of the illumination beam. The only purpose of these lens plates is to provide a uniform illumination of the object in the form of a slide. This specification does not mention the problem of increasing the quantity of radiation on the object and does not state that the shape of the lenses of the lens plates must be adapted to that of the object. In the embodiment shown each lens plate has a row of cylindrical lenses on its front side as well as its rear side, the cylindrical axes of the lenses on the front side being perpendicular to those of the cylindrical lenses on the rear side.

In an embodiment of the illumination system according to the invention third lens is integrated with the second lens plate. Consequently, the number of elements of the illumination system is decreased and the length of this system can be reduced.

Moreover, in another embodiment of the illumination system lenses of at least one of the lens plates are aspherical.

An aspherical lens is understood to mean a lens whose fundamental shape is spherical, but whose real shape slightly deviates therefrom so as to correct for spherical aberrations of the fundamental shape. The imaging quality can be improved by using aspherical lenses in a lens plate.

In a further embodiment of the illumination system according to the invention the number of second lenses is equal to the number of first lenses. This is preferably the case if each of the first lenses forms one distinctive smallest beam construction in the plane of the second lens plate.

Alternatively, in the illumination system the number of second lenses is twice the number of first lenses. This may be the case when each of the first lenses forms more than one smallest beam construction in the plane of the second lens plate, for example when the radiation source image is remote from the radiation source.

The illumination system is preferably further characterized in that the first lenses have such a size and are arranged in such a way that the surface of the first lens plate is approximately equal to the cross-section of the radiation beam incident thereon. A maximum quantity of radiation from the source is then collected.

In order to give the illumination beam such a shape that the subsequent optical elements in the radiation path, such as a projection lens, may be simple and inexpensive, in an additional preferred embodiment the illumination system the second lenses have such a shape and are arranged in such a way that the second lens plate is approximately circular. This circular shape is adapted, for example, to the entrance aperture of a projection lens system.

There are various further principal embodiments of the illumination system according to the invention. As far as the construction of the lens plates is concerned, the simplest embodiment is characterized in that the first lenses are arranged in accordance with a first matrix, in that the cross-sections, in a plane perpendicular to the principal axis, of the second lenses have the same shape as those of the first lenses, in that the second lenses are arranged in accordance with a second matrix conforming to the first matrix, and in that the width/height ratio of the second lenses corresponds to said ratio of the object cross-section.

The different possibilities within this principal embodiment can be divided into different classes, each class relating to different components of the system. The illumination system may combine characteristics from different classes.

The first class of these embodiments relates to the method of illuminating the lens plates and the dimensional proportions of these plates. A first embodiment of this class is characterized in that the radiation beam incident on the first lens plate is a parallel beam and in that the width and height of the first lenses are equal to those of the second lenses.

For this embodiment it is sufficient to manufacture only one type of lens plate, which is advantageous from a manufacturing technical point of view. If the lens plates are manufactured by molding replicas, only one mold would then be will be sufficient.

A second embodiment of the first class is characterized in that the radiation beam incident on the first lens plate is a diverging beam and in that the width and height of the first lenses are smaller than those of the second lenses.

Since the radiation beam supplied by the combination of radiation source and reflector need not be entirely parallel, the part of the illumination system arranged in front of the lens plates may have a simpler construction.

This is also the case for a third embodiment of the first class which is characterized in that the beam incident on the first lens plate is a converging beam and in that the width and height of the first lenses are larger than those of the second lenses.

A second class of embodiments relates to the positions of the images of the radiation source within the illumination system. A first embodiment of this class is characterized in that the first lens plate is arranged in a plane in which a first image of the radiation source is formed and in that said image is re-imaged on the object by the lens plates and the subsequent lens.

A second embodiment of the second class is characterized in that a reduced image of the radiation source is formed on each one of the second lenses.

The radiation source is herein understood to mean both the radiation source itself and its image which is formed by the reflector or other elements arranged in front of the lens plates, which image may coincide or not coincide with the source itself.

Under circumstances, the lens plates and the lenses in their vicinity may be integrated into composite elements. The third class of embodiments relates to these integration possibilities.

A first embodiment of this class is characterized in that the two lens plates are integrated in one plate having two outer surfaces one of which supports the matrix of first lenses and the other supports the matrix of second lenses.

This embodiment is notably interesting if the distance between the illumination system and the object to be illuminated may be small, for example because it is not necessary to arrange any further optical components between this system and the object. The distance between the matrix of first lenses and that of second lenses may then also be small and the single plate with two lens matrices need not be thick.

The illumination intensity at the edge of a display panel need not be exactly equal to that in the center of this panel. If this were the case, the displayed image would look unnatural, notably when displaying video images. It is then preferable that the illumination intensity slightly decreases from the center towards the edges of the display panel. This is realised in the last-mentioned embodiment if it is further characterized in that a lens plate has a curved surface such that the different pairs of associated first and second lenses have different distances between the first and second lenses.

The sub-beams originating from the lenses in the center of the plate form radiation spots at the area of the object to be illuminated, which radiation spots have dimensions which differ from those of the radiation spots formed by the sub-beams originating from the lenses at the edges of the plate. Since these radiation spots are superimposed, the total illumination intensity is not uniform.

A second embodiment of the third class is characterized in that at least one of the lens plates, together with an associated lens, is integrated in one optical element having at least one curved surface.

The "associated" lens which is arranged in front or behind a lens plate in the original design of the illumination system, now constitutes a support for the matrix of lenses so that a separate support is no longer required, thus giving the illumination system a simpler construction and making it easier to assemble.

If the associated lens is a planoconvex lens, this embodiment may be further characterized in that the matrix of lenses is arranged on the flat refractive surface of the lens.

Alternatively, this embodiment may be further characterized in that the matrix of lenses is arranged on a curved refractive surface of the lens.

As a further alternative, this embodiment may be characterized in that a curved refractive surface of the lens is replaced by a principally flat surface on which a matrix of lenses is arranged each having a curvature which is related to the curvature, at the location of the relevant matrix lens, of the original curved refractive surface.

Also in the case of a single lens plate with two matrices of lenses the matrix may be integrated on the front side and/or rear side with a lens which was originally arranged in front of or behind this plate. The integration of at least one lens plate and an associated lens may be alternatively effected in embodiments of the illumination system to be further described.

A fourth class of embodiments of the illumination system relates to the design of the part of this system in front of the first lens plate. A first embodiment of this class, in which the radiation source may be a lamp having a relatively large light arc, is characterized in that the reflector is a spherical reflector which only collects radiation emitted by the source at one side of the plane through the center of the radiation source and perpendicular to the optical axis of the system, and in that a condensor lens system is arranged at the other side of this plane and in front of the first lens plate.

An alternative embodiment is characterized in that the reflector is a spherical reflector which only collects radiation emitted by the source at one side of a plane through the center of the radiation source and perpendicular to the optical axis of the system, and in that two condensor lens systems are arranged at the other side of said plane, each system collecting a different part of the radiation from the radiation source and from the reflector.

The double condensor lens system has the advantage that it supplies a beam having a low throughput so that the optical elements of the apparatus in which the illumination system is used may be simple and inexpensive.

The term "throughput", or "luminosity" or "acceptance" characterizes the power of an optical system to transport radiation energy. This power is determined by the combination of an opening, or "stop", and the aperture at one and the same position in the optical system and can be expressed by the product of the surface of the opening and the spatial angle clamped by the pupil in the center of the opening. In an optical system which has a given throughput at the beginning, the throughput further down the system can only be diminished by blocking radiation.

Due to its low throughput, the double condensor lens system has the advantage that the apparatus in which the illumination system must be used does not require expensive optical elements having, for example large numerical apertures or large cross-sections, which is particularly important in apparatuses for consumer use.

The radiation beam passing through a condensor lens system may be both a parallel and a diverging beam.

If the radiation source is elongated, the first embodiment of the fourth class is preferably further characterized in that the longitudinal direction of the radiation source is perpendicular to the principal axis.

It is thereby achieved that all elongated images formed by the lenses of the first lens plate on the second lens plate have the same orientation. As a result the lenses of the second lens plate need not be larger than these images. By adapting the dimensions of the radiation source and its image formed by the reflector and the dimensions of the lenses, substantially the entire surface of the lens plate can be used for imaging. Consequently, the numerical aperture of optical elements in the apparatus in which the illumination system is used, such as that of a projection lens system if the apparatus is an image projection apparatus, can be limited.

It is to be noted that it is generally known, for example, from U.S. Pat. No. 4,722,593 to use a reflector at the one side of a radiation source and a condensor lens system at the other side of this source in a projection apparatus with a liquid crystal display panel. However, this known apparatus is not provided with lens plates. Moreover, in the apparatus according to the U.S. Pat. No. 4,722,593 the reflector, which is not further described, is arranged around the radiation source so that this reflector receives all source radiation which is emitted within an angle of more than 180°.

A condensor lens system must have a large numerical aperture so that a maximum possible quantity of radiation is captured. In principle this lens system may comprise one lens element. The first embodiment of the fourth class, comprising a single condensor lens, is preferably further characterized in that at least one refractive surface of the condensor lens is aspherical.

An aspherical lens surface is a surface whose fundamental shape is spherical but whose profile exhibits deviations from the sphericity so as to correct for aberrations of the fundamental shape of the lens. This asphericity provides the possibility of sufficing with one lens element where otherwise one or more correction lens elements would be required in connection with the required large numerical aperture.

The embodiment of the fourth class may alternatively be further characterized in that a condensor lens system comprises a single main condensor lens which is succeeded by at least one extra lens element.

The extra lens elements may take over a part of the required correction or lens power of the main condensor lens so that this lens is easier to manufacture and may be less expensive. The extra lens elements may also be used for improving the projection quality. If a part of the intensity of the condensor lens system is incorporated in the extra lens elements, these elements may be aspherical. The extra lens elements may alternatively be, for example Fresnel lenses which have the advantage that they are light and thin.

The double condensor illumination system may be further characterized in that the first lens plate is divided into two first lens plates which are arranged in the first and the second condensor lens system, respectively.

The length of the illumination device can be reduced by accommodating the first lens plate in the condensor lens system.

Apart from an illumination system comprising a spherical reflector and a condensor lens system, the present invention may alternatively be applied to great advantage in other embodiments in which other elements are used for concentrating the source radiation. A second embodiment of the third class is characterized in that the reflector is a parabolic reflector which surrounds the greater part of the radiation source.

A parabolic reflector has of itself the advantage that it captures a large portion of the source radiation. However, the radiation beam formed by this reflector has an inhomogeneous distribution of the illumination intensity. It is true that a more homogeneous distribution can be obtained by arranging the radiation source outside the focal point of the parabola, but then the beam has a large angular aperture so that the projection lens system must have a large numerical aperture. The illumination intensity distribution can be made more homogeneous by using the said lens plates in an illumination system with a parabolic reflector.

Since for each image formed on the lenses of the second lens plate the radiation originates from a different portion of the parabolic reflector, all of which portions have a different orientation with respect to the radiation source, all of the said images have a different orientation with respect to the lens plate. To make use of the available radiation to a maximum efficient extent, the second embodiment and further embodiments to be described of the fourth class may be further characterized in that the width and height of the lenses of the second lens plate are larger than those of the images formed on said lenses.

The full surface of each second lens is then not used for imaging. Particularly when using a conventional radiation source, such as a metal halide lamp having relatively large dimensions, the projection lens system must have a relatively large numerical aperture. This would render the use of lens plates less interesting. However, with of lamps having larger brightnesses and smaller dimensions an illumination system with a parabolic reflector and lens plates will be at least as attractive as the illumination system with a spherical reflector, condensor lens system and lens plates.

The remarks made hereinbefore with reference to the second embodiment of the fourth class also apply to a third embodiment of this class. This embodiment is characterized in that the reflector is an elliptic reflector which surrounds the greater part of the radiation source.

The radiation beam originating from the elliptic reflector may be a converging beam so that the width and height of the lenses of the first lens plate are larger than those of the lenses of the second lens plate.

Further, according to a further characteristic, a collimator lens may be arranged between the reflector and the first lens plate in this embodiment. In this case the width and the height of the lenses of the first lens plate are equal to those of the lenses of the second lens plate.

A third embodiment of the fourth class is characterized in that the reflector is a hyperbolic reflector which surrounds the greater part of the radiation source.

The beam originating from the hyperbolic reflector is a diverging beam so that the width and the height of the lenses of the first lens plate are smaller than those of the lenses of the second lens plate.

Forth, this third embodiment may be further characterized in that a collimator lens is arranged between the reflector and the first lens plate. The width and height of the lenses of the first lens plate are then equal to those of the lenses of the second lens plate.

If the embodiments of the fourth class have an elongated radiation source, these embodiments are preferably further characterized in that the longitudinal direction of the radiation source is parallel to the principal axis.

The second principal embodiment of the illumination system according to the invention relates to such a system in which the radiation source is elongate, with its longitudinal direction parallel to the principal axis and with a parabolic, elliptic or hyperbolic reflector, and is characterized in that the cross-section, in a plane perpendicular to the principal axis, of the second lenses is a $3n$ polygon in which $n=1, 2$, etc., the outer sides of the outer lenses approximately following the local curvature of a circumscribed circle, and at least two sides of each outer lens and all sides of all other lenses engaging sides of adjoining lenses.

The second lenses are shaped in such a way that they adequately capture the differently oriented radiation spots formed by the first lenses and that they satisfactorily fill the plate surface. Moreover, the shape of the lens plate is satisfactorily adapted to the subsequent optical elements in the apparatus in which the illumination system is used.

The second principal embodiment is preferably further characterized in that the cross-sections of the second lenses are hexagons.

A third principal embodiment of the illumination system having the same construction and advantages as the second principal embodiment is characterized in that the cross-sections of the second lenses are segments of a circle, in that said lenses engage each other and in that the second lens plate is round.

A fourth principal embodiment of the illumination system is characterized in that the cross-sections of the second lenses are segments of a ring, in that said lenses engage each other and in that the second lens plate is round.

This principal embodiment may be further characterized in that the second lenses are arranged in at least two rings.

A fifth principal embodiment of the illumination system according to the invention is characterized in that the second lens plate comprises a first set of lenses whose cross-sections are segments of a circle and a second set of lenses whose cross-sections are segments of a ring and which are arranged in at least one ring.

The invention also relates to an image projection apparatus comprising successively an illumination system, a display system having at least one display panel for generating images to be projected and a projection lens system for projecting these images on a projection screen. This apparatus is characterized in that the illumination system is one of the above-mentioned systems and in that a lens for imaging the exit pupil of the illumination system on the entrance pupil of the projection lens system is arranged in the radiation path in front of and proximate to the display panel.

An embodiment of the image projection apparatus, which is important in practice and which comprises the said illumination system is a color image projection apparatus having three color channels for the three primary colors red, green and blue, each color channel comprising a separate display panel. This apparatus is characterized in that it comprises one illumination system for supplying separate beams for the three color channels via color-splitting means.

This apparatus may be alternatively characterized in that each color channel comprises a separate illumination system of one of the types described hereinbefore.

BRIEF DESCRIPTION OF THE DRAWINGS

Embodiments of the invention will now be described in greater detail with reference to the accompanying drawings, in which FIG. 27 shows an illumination system with a parabolic reflector and a second embodiment of the second lens plate, FIG. 28 shows a third embodiment of the second lens plate, FIG. 29 shows an illumination system with a parabolic reflector and a fourth embodiment of the second lens plate, FIGS. 30 and 31 show further embodiments of the second lens plate.

DETAILED DESCRIPTION OF THE PREFERRED EMBODIMENTS

Figure 1:
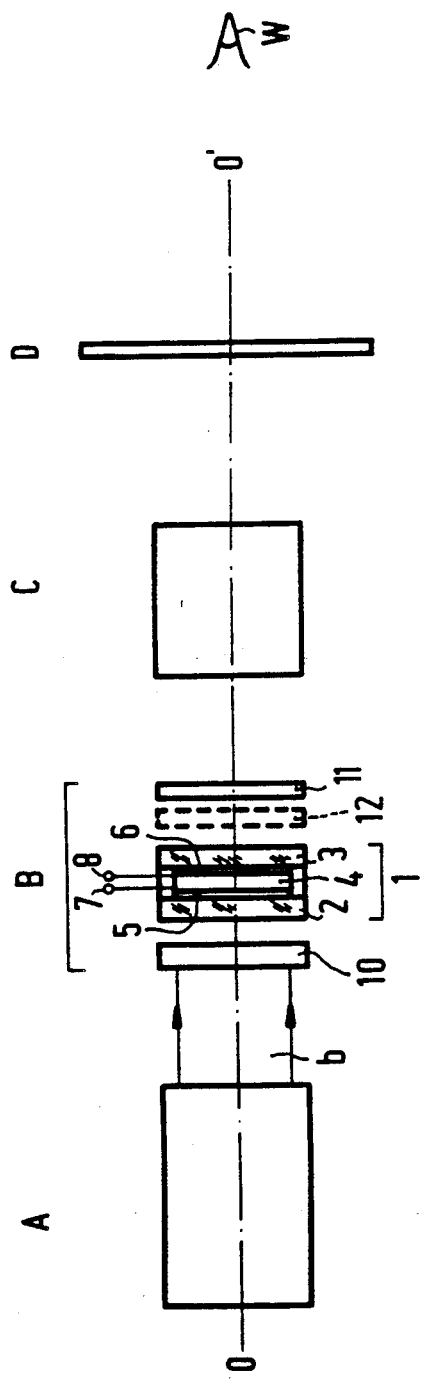
FIG. 1 shows the diagram of an image projection apparatus.

In FIG. 1 the block A represents an illumination system which emits a radiation beam b whose principal axis coincides with the optical axis DD' of the image projection apparatus. This beam is incident on the display system B which has one display panel 1 if a monochromatic image must be projected. This panel is, for example a liquid crystal display panel (LCD). Such a panel comprises a layer of liquid crystalline material 4, for example, of the nematic type which is enclosed between two transparent plates 2 and 3 of, for example, glass. Drive electrodes 5 and 6 are arranged on each plate. These electrodes may be divided into a large number of rows and columns so that a large number of pixels in the display panel is defined. The different pixels are then driven by driving the matrix electrodes, as is shown diagrammatically by means of the drive terminals 7 and 8. Thus an electric field can be applied across the liquid crystalline material 4 at the desired positions. Such an electric field causes a change of the effective refractive index of the material 4 so that the light passing through a given pixel undergoes or does not undergo a rotation of the direction of polarization, dependent on the absence or presence of a local electric field at the location of the relevant pixel.

Instead of this so-called passive-drive panel, it is also possible to use an active-drive panel. In the last-mentioned display panel one of the supporting plates has an electrode while the semiconductor drive electronics are arranged on the other plate. Each pixel is now driven by its own active drive element such as, for example, a thin film transistor. Both types of direct-drive display panels are described in, for example, European Patent Application No. 0,266,184.

The beam incident on the display panel 1 must be polarized, preferably linearly polarized. However, the illumination system A produce unpolarized radiation. Of this radiation a linearly polarized component having the desired direction of polarization is selected by means of a polarizer 10. An analyzer 11, whose direction of polarization is, for example effectively parallel to that of the polarizer 10, is arranged in the path of the radiation passed by the display panel. As a result the radiation originating from those pixels which are energized and which do not change the direction of polarization of the beam will be passed by the analyzer to a projection lens system C. The radiation originating from the non-energized pixels which rotate the direction of polarization of the beam through 90° is blocked by the analyzer. The analyzer thus converts the polarization modulation of the beam into an intensity modulation. The projection lens system C projects the image formed on the panel 1 on a projection screen D. This projected image can be observed by a spectator W who is present in the room behind the projection screen.

In the above described embodiment the pixels across which no electric field is applied are imaged as black dots on the projection screen D. It is alternatively possible to drive a pixel in such a way, i.e. to apply such a field strength across this pixel that the direction of polarization of the incident linearly polarized light is not rotated 90°, but this linearly polarized light is converted into elliptically polarized light. A portion of this light is passed towards the projection screen and the rest is blocked. The relevant beam element is then not imaged as a black or white element on the projection screen but as a grey element, whose greyness is adjustable.

Instead of linearly polarized light, an image projection device with liquid crystal display panels can in principle also use circularly or elliptically polarized light. The display panel can then change the direction of rotation of the circularly polarized light or the ratio of the elliptical axes of the elliptically polarized light. The light should then ultimately be converted into linearly polarized light by means of extra polarization means and the said changes should be converted into changes of the direction of polarization of this linearly polarized light.

If a display system is used whose pixels in the driven state rotate the direction of polarization and do not rotate this direction in the non-driven state, an additional polarization rotator in the form of an extra layer of liquid crystalline material rotating the direction of polarization of the complete beam through 90° may be arranged in series with the display panel 11, so that the image on the projection screen has the same polarity as the image which is formed in a device with a display panel whose pixels in the driven state do not rotate the direction of polarization.

Such additional polarization rotator, which is denoted by reference numeral 12 in FIG. 1 may also be used if in an arrangement in which the pixels in the driven state do not rotate the direction of polarization these pixels are still to appear as black pixels on the projection screen, for example, for obtaining an increased contrast or for reducing the color dependence of the device, or for raising the switching speed of the display panel.

Instead of a layer of liquid crystalline material a $\lambda/2$ plate, in which $\lambda$ is the wavelength of the projected light, can be used as an additional polarization rotator 12. As a further alternative the analyzer may be rotated 90° with respect to the original orientation.

When used in transmission, a liquid crystal display panel has a low efficiency, for example only 10% of the radiation incident on the panel is passed to the projection lens system. Moreover, this system images the panel in a magnified form so that the illumination beam should have a large intensity if there is still to be sufficient radiation intensity per unit of surface area on the screen. The use of a radiation source in the form of a lamp having a higher intensity provides only limited improvement. In fact, lamps having a higher light intensity generally also have a larger radiating surface area in the form of a lamp arc so that the output aperture of the illumination system is larger. When reducing the beam aperture so as to limit the dimensions of the subsequent optical components in the projection apparatus, a part of the light energy would be lost again. It is therefore desirable to receive as much light as possible from the lamp and to concentrate it to a narrow beam. A further requirement is that the cross-section of this beam at the display panel should be adapted to a maximum possible extent to the rectangular shape of this display panel so that a minimum possible quantity of light falls beyond this panel.

Figure 2:
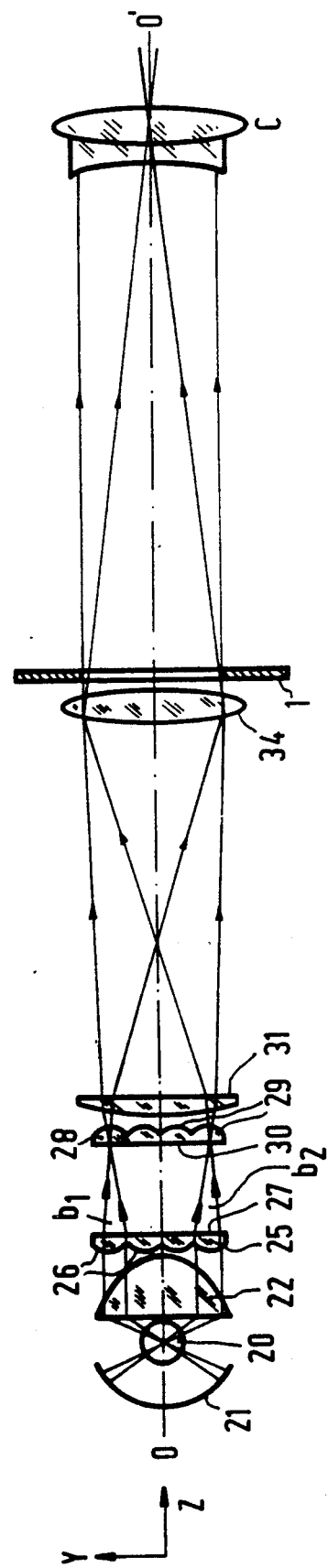
FIG. 2 shows a first embodiment of an illumination system according to the invention for this apparatus.
Figure 3:
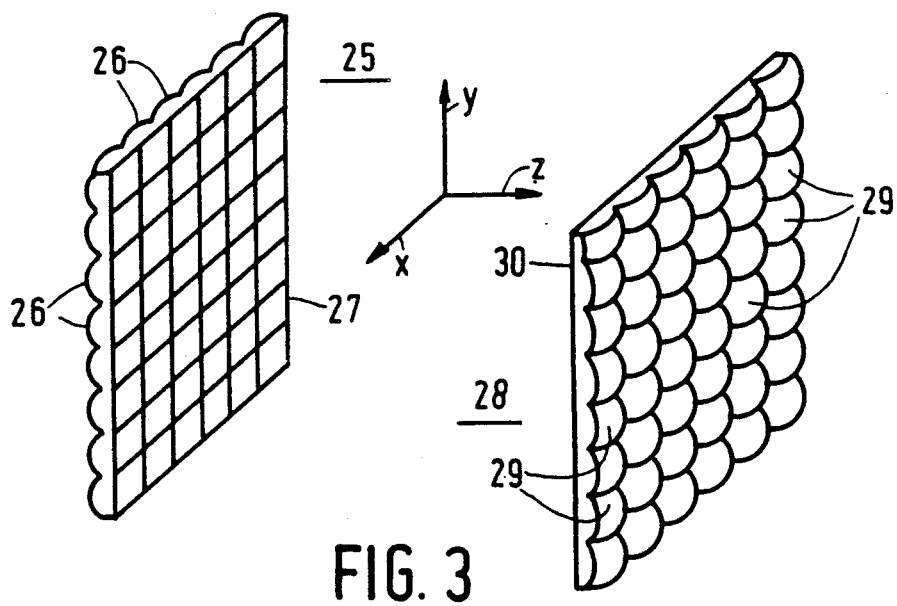
FIG. 3 shows the lens plates used in this illumination system.

FIG. 2 shows a first embodiment of an illumination system according to the invention in which the above-mentioned requirements are met. This system comprises a lamp 20 which emits light in the direction of the display panel 1 as well as in the rearward direction (at the left in FIG. 2). A spherical reflector 21 receiving the rearwardly emitted light and forming an image of this lamp is arranged at the rear side of the lamp. In FIG. 2 the lamp image formed by the reflector 21 coincides with this lamp. It has been assumed that the lamp is transparent to its own light. This will often not be the case in practice. In that case it is ensured that the lamp image is situated beside the lamp. The light emitted by the lamp and its image are received by a condensor lens system 22 which concentrates this light to a parallel beam, in other words it images the lamp to infinity. The parallel beam is incident on a first lens plate 25. The side of this plate facing the source is provided with a matrix of lenses 26 and the other side 27 is preferably flat. FIG. 3 shows this plate in a perspective view.

For the sake of simplicity FIG. 2 only shows four lenses. Actually, the plate 25 comprises, for example $8 \times 6$ lenses, as is shown in FIG. 3. Each of these lenses 26 images the source 20 on an associated lens 29 of a second lens plate 28. The source-facing side 30 of this plate, which is also shown in a perspective view in FIG. 3, is flat, while the side remote from the source supports a matrix of lenses 29. The number of rows and columns of lenses of the plate 28 corresponds to the number of the lenses of the plate 25. To image the radiation source on the different lenses 29 by means of the corresponding lenses 26, a different portion of the beam b incident on the plate 25 is used each time. For the sake of clarity FIG. 2 only shows two sub-beams $b_1$ and $b_2$. Each lens 29 ensures that a radiation spot formed on the corresponding lens 26 is imaged on the display panel 1. A lens 31 ensuring that all re-images are superimposed on one another in the plane of the display panel is arranged behind the second lens plate 28. This results in the illumination intensity distribution in this plane having the desired uniformity, the degree of uniformity being determined by the number of lenses of the plates 25 and 28.

The liquid crystal display panels which are used when displaying conventional video images have an aspect ratio b:h=4:3, the width b being the dimension in the X direction, perpendicular to the plane of the drawing in FIG. 2, and the height h being the dimension in the Y direction in the plane of the drawing of FIG. 2 and perpendicular to the optical axis DD'. In the embodiment of FIG. 1 the lenses 26 and 29 of the plates 25 and 28 have the same aspect ratio. As a result, all radiation coming from the condensing lens system and entering through the first lens plate passes through the display panel and the illumination system has a high collection efficiency.

Figure 4:
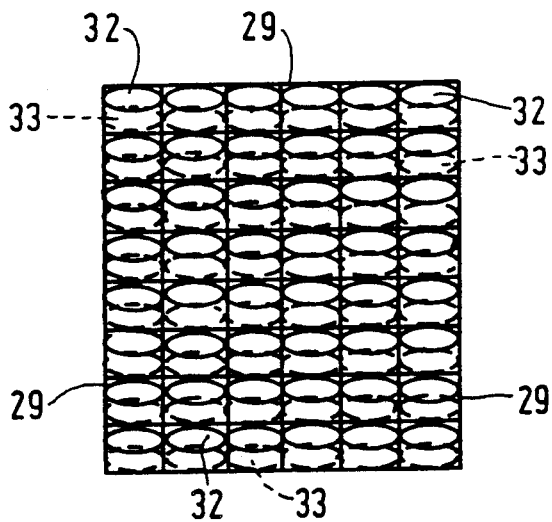
FIG. 4 is a rear view of the second lens plate with the images of the radiation source formed on this plate.

FIG. 4 is a rear view of the second lens plate 28 in which the aspect ratio of the lenses 29 is clearly visible. This Figure also shows the images of the radiation source formed on the lenses 29. It has been assumed that the reflector 21 images the radiation source beside itself for the greater part so that two source images 32 and 33 are formed on each lens 29. All these source images have the same orientation. As a result of this and due to a correct choice of the dimensions of the radiation source and its image formed by the reflector 21, which dimensions are determined by the position of the reflector 21, the surface area of each lens 29 can be substantially fully utilised. The dimensions of these lenses and those of the lens plates can then remain limited so that also the numerical aperture of the projection lens system C with which the display panel is imaged on the projection screen, which is not shown in FIG. 2, can remain small.

In the image projection apparatus of FIG. 2 a further lens 34 imaging the exit pupil of the illumination system in the entrance pupil of the projection lens system C is arranged in front of the display panel 1.

The size of the lenses 26 is determined by the desired size of the diagonal of the beam cross-section at the area of the display panel 1 and by the magnification of the lens system formed by the lens 31, the lens 34 and the lenses 29. The size of a liquid crystal display panel is generally expressed in the diagonal $D_1$ of this panel. The diagonal $D_{26}$ of the lenses 26 is given by $$D_{29} = \frac{D_1}{M_{34}} \times \frac{f_{29}}{f_{31}}$$

in which $f_{29}$ and $f_{31}$ represent the focal length of a lens 29 and the lens 31, respectively, and $M_{34}$ represents the magnification with which the lens 34 images a radiation spot formed by the lens 31. In one embodiment of the image projection apparatus the diameter of the display panel is 48 mm the magnification $f_{29}/f_{31}$ is approximately 0.3 and $M_{34}$ is approximately 0,9 so that the diagonal of the lenses 26 is approximately 16 mm and these lenses have a width of approximately 12,8 mm and a height of approximately 9,6 mm.

Figure 5:
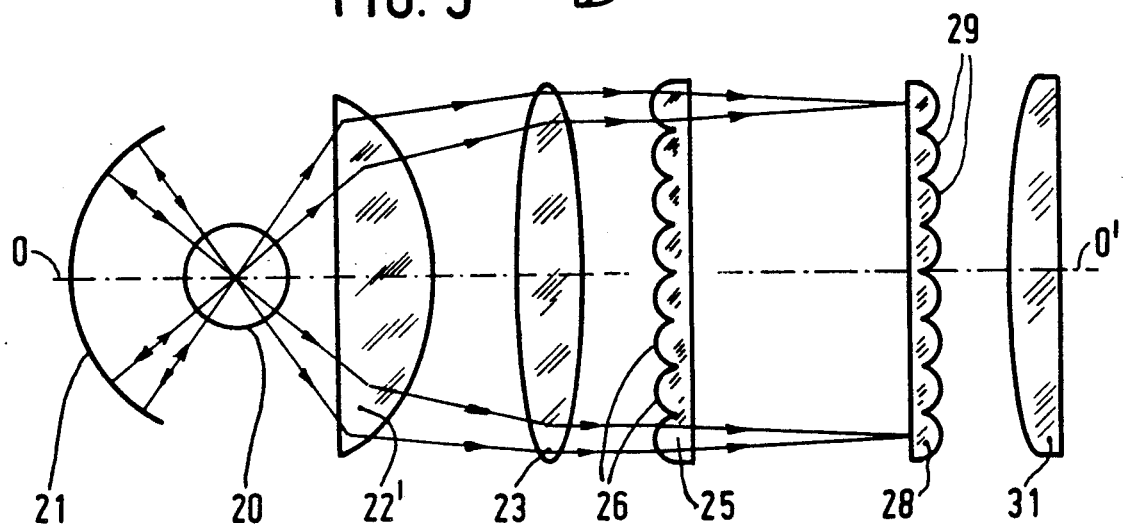
FIG. 5 is a first modification of the first embodiment comprising a composite condensor lens system.

The condensor lens system must have a large numerical aperture, for example of the order of 0.85 so as to enable it to collect sufficient radiation from the source. As is shown in FIG. 2, the condensor lens system may be in the form of a single, thick lens element 22. In order that the imaging errors remain limited, this lens element should have at least one aspherical surface. The requirements imposed on the lens element 22 can be alleviated if one or more additional lens elements are added to this lens element, as is shown in FIG. 5 by lenses 22' and 23.

The additional lens elements may supply a part of the required correction of the main lens element 22' and may be, for example, aspherical. It is alternatively possible for a part of the required power of the condensor lens system to be built in the additional lens elements. The additional elements may not only be elements having curved refractive surfaces but also light and thin Fresnel lens elements or lens elements having a radially varying refractive index.

Figure 6:
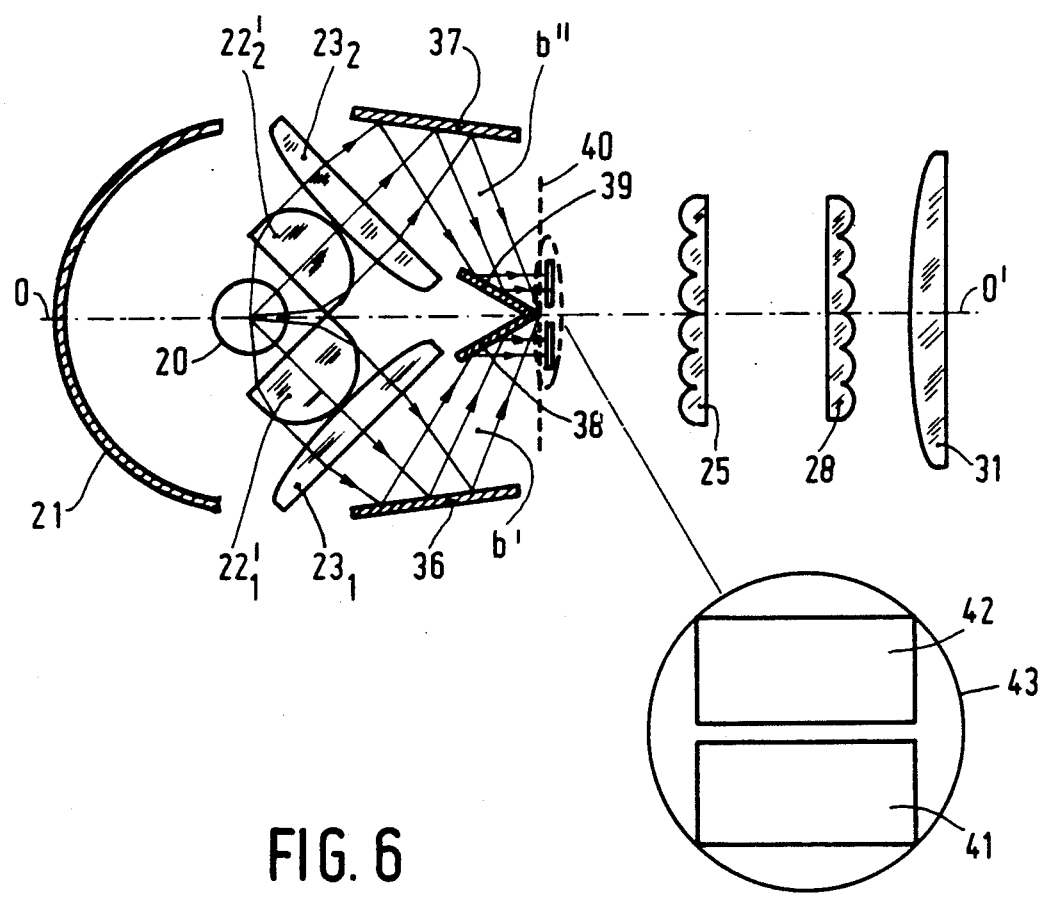
FIG. 6 is a second modification of the first embodiment comprising a double condensor lens system.

Instead of a single condensor lens system the illumination system may also comprise a double condensor lens system, as is shown in FIG. 6. In this illumination system two condensor lens systems $22_1'$, $23_1$ and $22_2'$ and $23_2$, respectively are arranged at the front side of the radiation source 20. This radiation source is, for example an elongated metal halide lamp having a length-width ratio of, for example, 2:1. As in FIGS. 2 and 5, the longitudinal direction of the lamp is perpendicular to the optical axis OO'. The radiation collected by the condensor lens system is concentrated in two sub-beams b' and b" which are reflected to the optical axis OO' by reflectors 36 and 37. Two reflectors 38 and 39, which constitute a roof mirror, are arranged on both sides of the optical axis at a position where the principal axes of the beams b', b" would intersect each other and where the beam cross-sections are small. These reflectors deflect the beams b', b" towards the optical axis OO'. The smallest constrictions of these beams are in a plane 40, so that in this plane two secondary radiation sources having small radiating surfaces are arranged.

The inset of FIG. 6 shows these radiation sources, or lamp images 41, 42 in a front elevation. The dimensions of these images, reckoned back to the position of the lamp, are equal to those of the lamp. The radius of the circle 43 within which the images 41 and 42 are located is smaller than twice the radius of the described circle of the radiation source so that the radiation of the source 20 is concentrated to a beam having a small cross-section by the double condensor lens system. Moreover, the apertures of the beams b', b" with which the images 41 and 42 are formed are relatively small. This means that the double condensor lens system has a low throughput.

Since the double condensor lens system has a low throughput, the image projection apparatus in which the illumination system is used does not require expensive optical elements having, for example large numerical apertures or large cross-sections, which is particularly important in apparatuses for consumer use.

Reflector 21 which reflects the radiation emitted from the rear side of the source to the condensor lenses $22_1'$, $22_2'$ is arranged behind the radiation source 20 also in the double condensor lens system, so that the intensity of the beams b', b" and hence the efficiency of the illumination system is increased.

In order to achieve that the optical elements arranged subsequent to the illumination system can have the smallest possible numerical aperture and can be implemented as simply and hence as inexpensively as possible in an optical apparatus, the shape of the first lens plate is preferably adapted as satisfactorily as possible to the cross-section of the beam which is incident on this plate. Furthermore, the shape of the second lens plate is preferably adapted as satisfactorily as possible to the numerical aperture of the optical system, for example, a projection lens system which is arranged behind the display panel.

Figure 7:
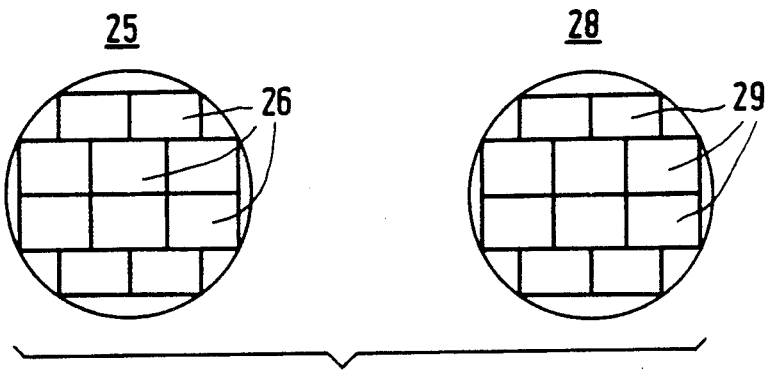
FIG. 7 shows an embodiment of the first and the second lens plate of the illumination system of FIGS. 2 and 5.

For the illumination system of FIGS. 2 and 5 this means that the lenses of the first lens plate 25 and the lenses of the second lens plate 28 have such a size and are arranged in such a way that they jointly fill a circular surface as satisfactorily as possible, as is shown in FIG. 7. This Figure is a rear view of the plate 25 with lenses 26 and a front view of the plate 28 with lenses 29.

Figure 8:
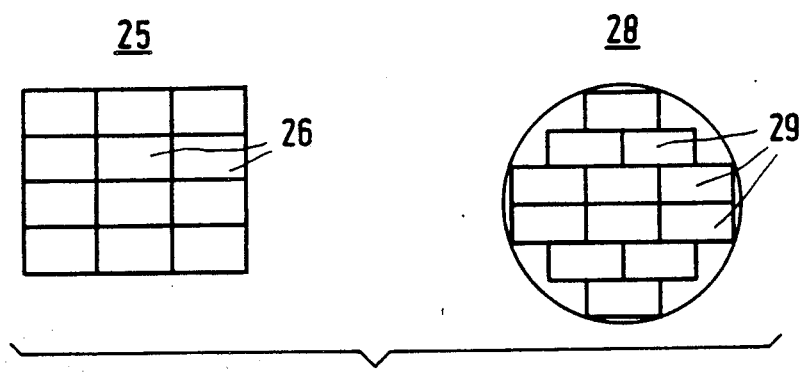
FIG. 8 shows an embodiment of the first and the second lens plate of the illumination system of FIG. 6.

In the illumination system of FIG. 6, in which the source images 41 and 42 are rectangular, the first lens plate 25 preferably has an approximately square shape, while the second lens plate preferably has an approximately circular shape, as is shown in FIG. 8. Similarly as in the illumination systems of FIGS. 2, 5 and 6, each lens 26 of the plate 25 must refract a sub-beam incident thereon in such a way that the principal axis of this sub-beam is directed towards the center of an associated lens 29 of the second lens plate.

Figure 9:
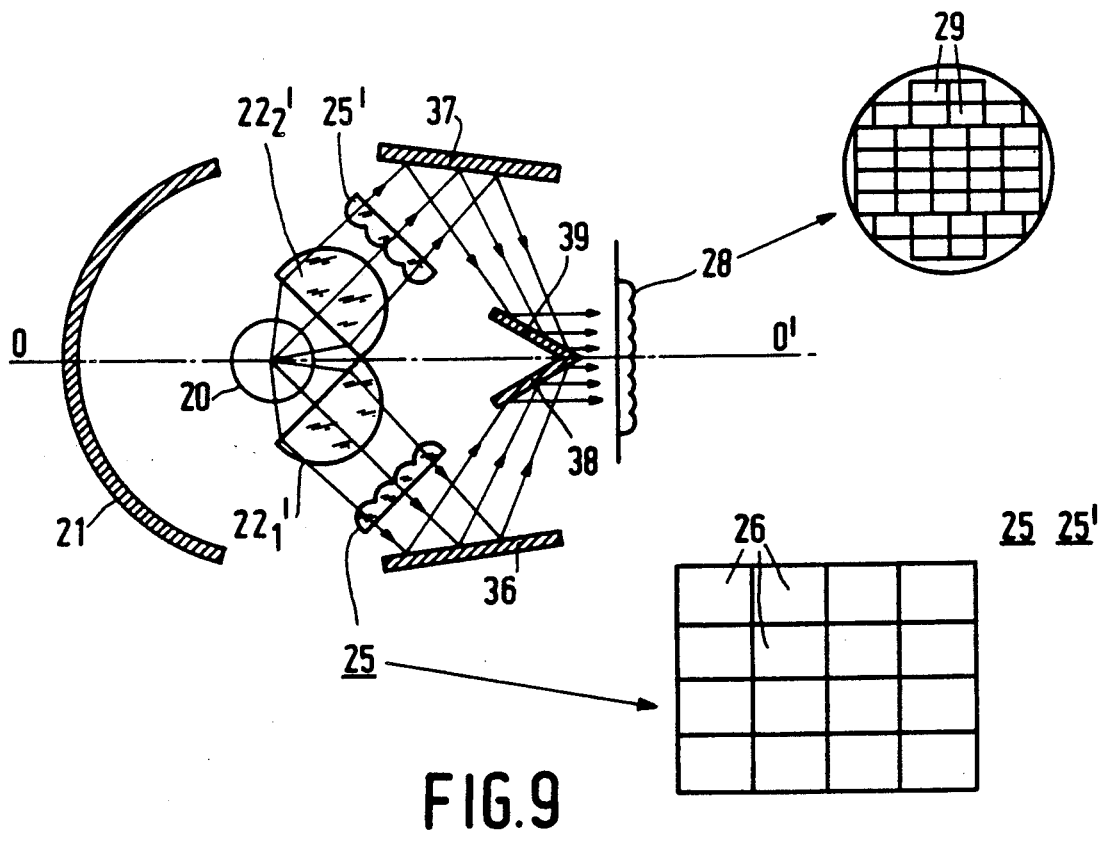
FIG. 9 shows an alternative embodiment of the illumination system of FIG. 6.

FIG. 9 shows an embodiment of the illumination system comprising a double condensor system in which two first lens plates 25, 25' are used. The lens plates 25, 25' are arranged, for example between the main condensor lenses $22'_1$ and $22'_2$ and reflectors 36, 37, respectively. The beams b' and b'' have a rectangular cross-section at the area of the lens plates 25 and 25', so that these lens plates are preferably also rectangular, as is shown in FIG. 9. The lens plate 28 has a round shape so as to be optimally adapted to the optical elements which are arranged behind the display panel. This lens plate has, for example twice as many lenses as each lens plate 25 and 25'.

The lens plate 25 or 25' may not only be arranged between the main condensor lens $22'_1$ or $22'_2$ and the reflector 36 or 37, but also between this reflector and the subsequent reflector 38 or 39.

The embodiment of FIG. 9 may comprise extra condensor lens elements, analogous to the lens elements $23_1$ and $23_2$ of FIG. 6. However, it is alternatively possible to integrate such lens elements with the lens plates 25 and 25', analogous to the following description with reference to FIGS. 11-18.

Since the radiation beam incident on the first lens plate 25 in the illumination system according to FIGS. 2 and 5 is a parallel beam, the lenses of the plate 25 may have the same width and height as those of the plate 28. Then only one type of lens plate should be manufactured, using one mould.

Figure 10:
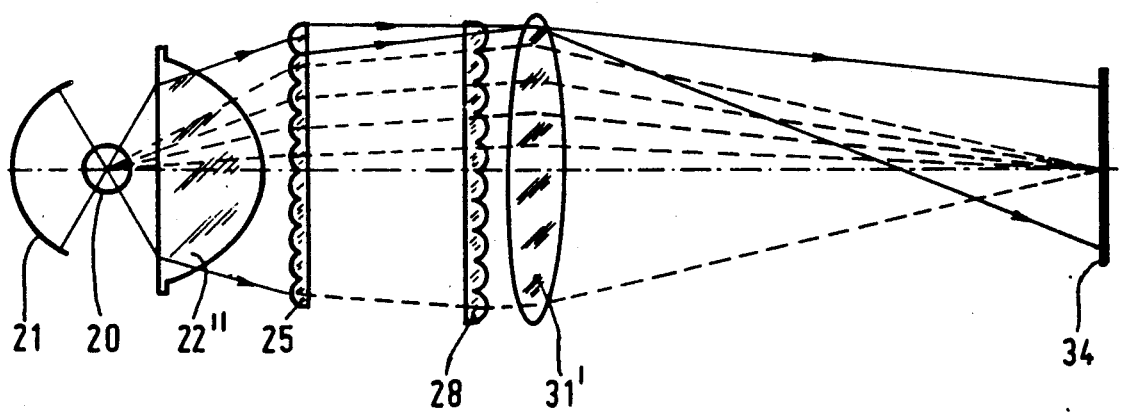
FIG. 10 is a modification of the first embodiment comprising two unequal lens plates.

Under circumstances it may be desirable to alleviate the requirements imposed on the single condensor element 22 of FIG. 2. This is the case if the radiation beam from this element 22'' is a diverging beam instead of a parallel beam, as is shown in FIG. 10. The lenses of the second lens plate 28 must then have a larger width and height than those of the first lens plate 25.

A similar arrangement as that shown in FIG. 10 is obtained if the condensor element 23 in the embodiment of FIG. 5 is arranged behind the second lens plate 28.

Figure 11:
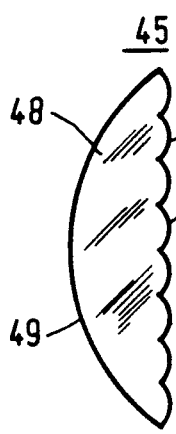
FIGS. 11 to 17 show different possibilities of integrating a lens plate with a lens.
Figure 12:
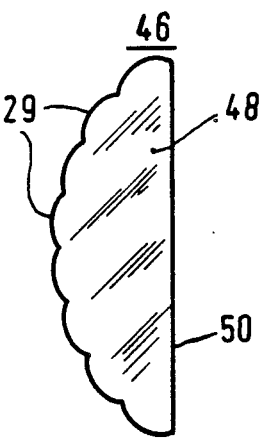
Figure 13:
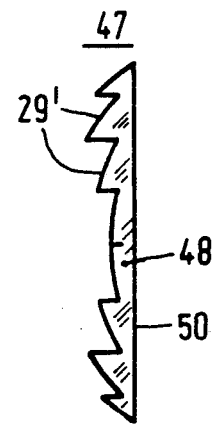

In the embodiments according to FIGS. 2, 5, 6 and 7 the lens plate 28 and the planoconvex lens 31 can be integrated in one element 45, 46 and 47 as is shown in FIGS. 11, 12 and 13, respectively. The lens then serves as a support for the matrix of lenses 29 so that the illumination system comprises one element less, which simplifies the system and makes it easier to assemble. In the embodiment according to FIG. 11 the matrix of lens 29 is arranged on the flat surface of the lens body 48 and the curved surface 49 retains its original shape.

In the integrated lens element according to FIG. 12 the matrix of lenses 29 is arranged on the curved surface of the lens body 47 and the other surface 50 is flat.

FIG. 13 shows an embodiment of the integrated lens element 47 in which the curved surface is replaced by the different curvatures of the lenses 29'. In principle the curvature of a matrix lens 29' corresponds to that of the portion of the surface 49 in FIGS. 11 and 12 at the location of this matrix lens, but it is corrected for the fact that the sub-beam for this matrix lens transverses a thinner lens and would therefor acquire a different direction.

Figure 14:
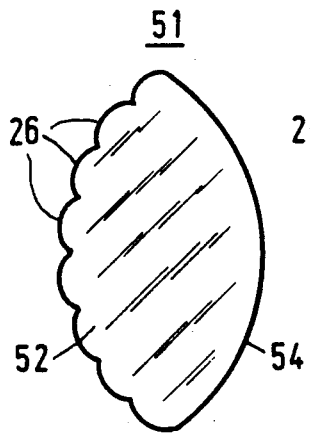
Figure 15:
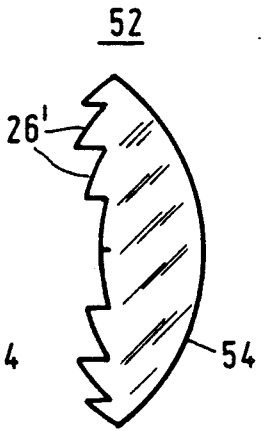

Also the lens 23 and the lens plate 25 in the embodiment of FIG. 5 may be replaced by an integrated element. This element may be formed in two manners as is shown in FIGS. 14 and 15. In the embodiment of FIG. 14 the matrix of lenses 26 is arranged on the first curved surface 52 of the integrated element 51. In the embodiment of FIG. 15 the matrix of lenses 26' is arranged on a principally flat surface of the integrated lens 52, the lenses 26' having different curvatures substantially corresponding to the curvatures of the first surface of the lens 23 in FIG. 5 at the location of the various matrix lenses 26.

Figure 16:
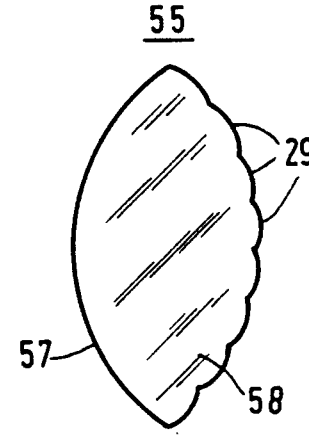
Figure 17:
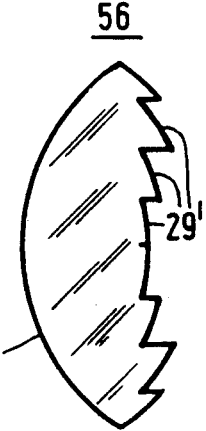

FIGS. 16 and 17 show two embodiments of composite lenses 55, 56, respectively, in which the functions of the lens plate 28 and the lens 31' of FIG. 10 are integrated. In view of the foregoing description FIGS. 16 and 17 do not require any further explanation.

In principle a convex lens surface may be replaced by a matrix of lenses on a substantially flat surface, the lenses having different curvatures. The lens 23 and lens plate 25 of FIG. 5 and the lens 31' and the lens plate 28 of FIG. 10 may then also be replaced by one integrated lens which resembles that of FIG. 13.

The different embodiments of the integrated lens elements according to FIGS. 11 to 17 may alternatively be used in the illumination systems to be described hereinafter, in which reflectors other than those in the system according to FIGS. 2, 5, 6 and 10 are used.

Since $f_{29}$ is equal to the distance $d_1$, between the lens plates 25 and 28, and $f_{31}$ is equal to the distance $d_2$, between the lens 31 and the image formed by the lens 34 on the object to be illuminated of a radiation spot formed by the lens 31, the ratio $d_1/d_2$ is also laid down by the follows relation $$D_{26} = \frac{D_1}{M_{34}} \times \frac{f_{29}}{f_{31}} = \frac{D_1}{M_{34}} \times \frac{d_1}{d_2}$$

The distance $d_2$ is determined by the design of the apparatus in which the illumination system is used. In the case of a color image projection apparatus a plurality of color selective mirrors requiring a given build-in length is generally arranged between the lens 31 and the display panel 1. The distance $d_2$, and hence the distance $d_1$ is then relatively large.

Figure 18:
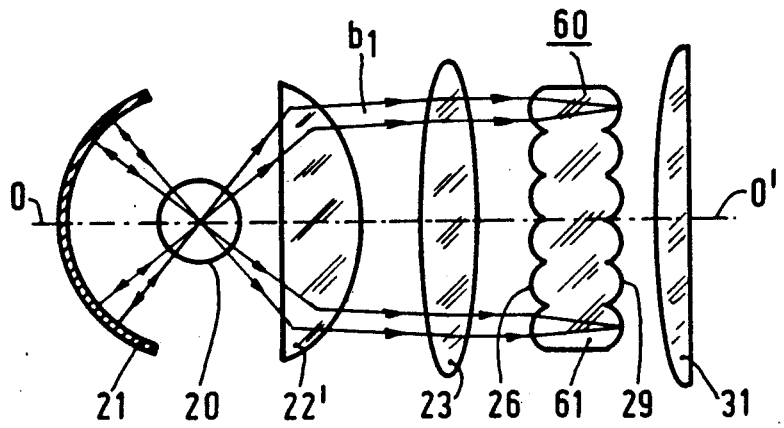
FIG. 18 shows an embodiment of the illumination system comprising one composite lens plate.

In other embodiments of a color image projection apparatus, or in other applications of the illumination system, the distance $d_2$, and hence the distance $d_1$ may be considerably smaller. In that case it is attractive to arrange the two matrices of lenses on one supporting plate, as is shown in FIG. 18.

In this embodiment an element 60 comprising a transparent, principally plane-parallel plate 61 whose front side is provided with a matrix of lenses 26 and whose rear side supports a matrix of lenses 29 is arranged behind the condensor lens system 22', 23. As is shown in FIG. 18, the lenses 26 may be equally large as the lenses 29. However, it is alternatively possible for the lenses 26 to be larger or smaller than the lenses 29, dependent on whether the beam incident on the element 60 is a converging beam or a diverging beam. Then one of the matrices of lenses will cover a larger portion of the plate surface than the other matrix.

The composite lens plate 60 may be manufactured, for example by means of known pressing or replica techniques, while the two matrices of lenses can be provided simultaneously by using two molds. The profile of the one matrix may be identical to that of the other matrix or it may be a linear enlargement thereof.

It is also possible to integrate the matrices of lenses of the lens plate 60 with lenses which should otherwise be arranged in front of or behind the lens plate, as has been described with reference to FIGS. 12 and 13.

The composite lens plate 60 may also be used in embodiments of the illumination system to be described hereinafter in which reflectors other than spherical reflectors are used.

As already noted, the illumination system according to the invention may supply a beam having a satisfactory uniform distribution of its illumination intensity. However, the illumination intensity at the edge of the object to be illuminated need not be exactly equal in all cases to that in the center of the object. Notably when displaying video images by means of a liquid crystal display panel the displayed image would look unnatural if the intensity were equal. It is then preferably for the illumination intensity to decrease to a slight extent from the center towards the edges of the display panel.

Figure 19:
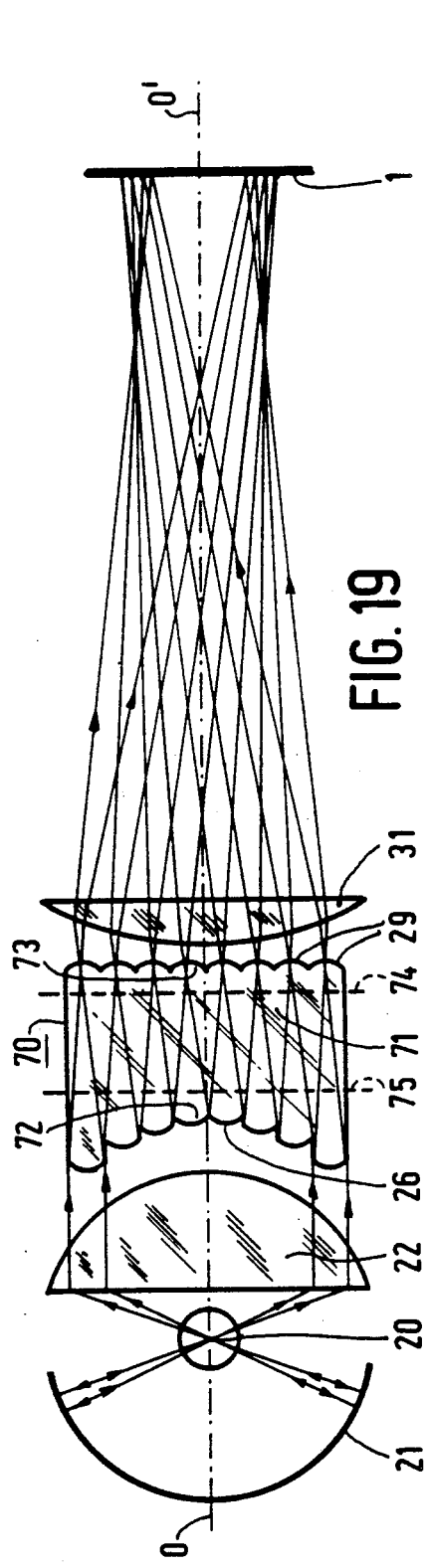
FIG. 19 shows such an embodiment in which the lens plate is adapted to obtain a special distribution of illumination intensity.

FIG. 19 shows an embodiment of the illumination system in which this is realised. This embodiment comprises a composite lens plate 70 having a transparent substrate 71, a first surface 72 of which is provided with a matrix of lenses 26 while a second surface 73 supports a matrix of lenses 29. In principle, the surface 73 is flat, while the surface 72 is curved so that the thickness of the substrate 71 in the center is smaller than at the edge. It can be ensured that each beam portion originating each time from a lens pair 26, 29 is focused on the object. The magnification with which the radiation spots formed on the lenses 26 are imaged on the object, which magnification D1/D26 is given by: D1/D26=f31/f29, is different for the different lens pairs due to the different mutual distances between the lenses 26 and 29 of a pair. The focal length f29 is smallest for the central lenses 29 so that the images formed by means of these lenses on the object are larger than the images formed at the edge of the lens plate by means of the lenses 29.

The illumination system may be adapted in such a way that beam portions coming from the different pairs of lenses are focused on different axial positions. The sub-beams originating from the lens pairs 26, 29 which are located against the optical axis OO' may be focused on the display panel 1. The beam portions originating from the lens pairs which are further and further remote from the axis OO' are more and more defocused on the panel 1. A number of radiation spots having an increasing size and a decreasing illumination intensity per unit of surface area is now superimposed at the location of this panel. This results in a total radiation spot having an illumination intensity decreasing from the center.

Due to the finite number of lenses of the lens plate 70 the decrease in intensity in the plane of the panel 1 varies stepwise. With a given number of lenses 26 and 29 these steps will quickly become invisible to the observer. It is also possible to arrange the display panel at some distance from the focal plane to make the steps invisible.

The same effect may alternatively be achieved with a number of rod-shaped elements of varying length which are placed against one another and are provided with lenses 26 and 29 at their front and rear sides, respectively, instead of using a solid lens plate 70.

The special distribution of the illumination intensity may not only be realised by means of the relatively thick lens plate 70 of FIG. 19, but also by means of two lens plates the first of which has a shape corresponding to the front portion of the plate 70 while the shape of the second lens plate corresponds to that of the rear portion of the plate 70, as is shown by means of broken lines 74 and 75 in FIG. 19.

The matrix of lenses 29 may be integrated with the lens 31 in the manner as described with reference to FIG. 13. If a lens is arranged in front of the plate 70, like the lens 23 in FIG. 5, this lens may be integrated with the matrix of lenses 26.

The composite lens plate 70 or its modifications may also be used in the embodiment of the illumination system to be described hereinafter in which reflectors other than spherical reflectors are used.

Figure 20:
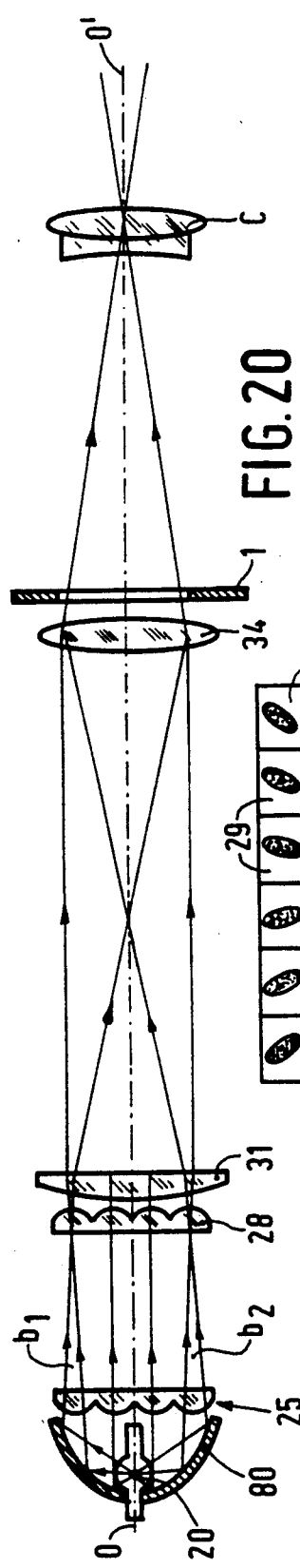
FIG. 20 shows an embodiment of the illumination system with a parabolic reflector around the radiation source.

The embodiments of the illumination system with condensor lenses described so far are attractive because the lenses of the second lens plate 28 need not be larger than the images formed on these lenses. However, if a radiation source with smaller dimensions can be used, other embodiments of the illumination system which do not require any system of condensor lenses are equally attractive. A first embodiment of such an illumination system is shown in FIG. 20.

Figure 21:
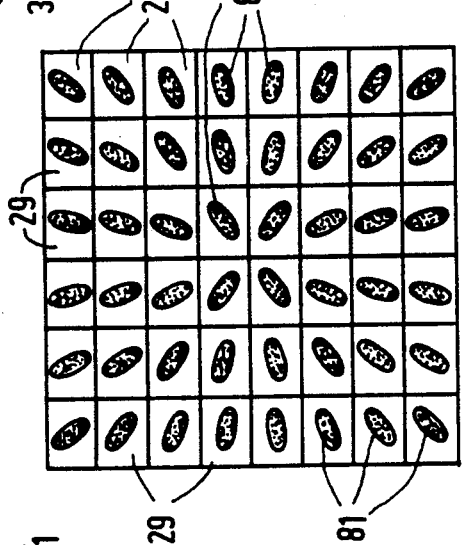
FIG. 21 shows the images of the radiation source formed on the second lens plate of this system.

In this Figure the reference numeral 20 again denotes a radiation source in the form of a lamp having an elongated light arc whose longitudinal direction coincides with the optical axis OO'. A large portion of this lamp is surrounded by a parabolic reflector 80 which reflects the greater part of the radiation emitted by the lamp towards the lens plate 25. The reflector 80 images the radiation source 20 to infinity. The lens plate 25 forms a number of source images, corresponding to the number of lenses 26 in the plate, on the second lens plate 28. Since the different beam portions $b_1$, $b_2$ etc. with which the different images are formed originate from different portions of the reflector 80, all of which portions have a different orientation with respect to the radiation source 20, all of said images have a different orientation with respect to the lens plate 28, as is shown in FIG. 21.

In this Figure, which is a rear view of the lens plate 28, the said images are denoted by the reference numeral 81. The rectangular lenses are again denoted by the reference numeral 29. If a maximum quantity of radiation must be collected on the display panel 11, the height and width of the lenses 29 are preferably larger than those of the images 81.

Without any further measures this preferred embodiment of the illumination system with enlarged lenses 29 would not be very suitable in practice, because the numerical aperture of the projection lens system C, which is dependent on the surface of the lens plate 28, might become too large. To prevent this, a radiation source is used which has smaller dimensions than those of the radiation sources hitherto used in image projection apparatuses. The dimensions of the lenses and hence the numerical aperture of the projection lens system can then remain limited despite the fact that the surfaces of the lenses 29 are larger than the images 81.

The lenses 31 and 34 in FIG. 20 have the same function as the corresponding lenses in the embodiments shown in FIGS. 2, 5, 6, 10, 18 and 19.

Figure 22:
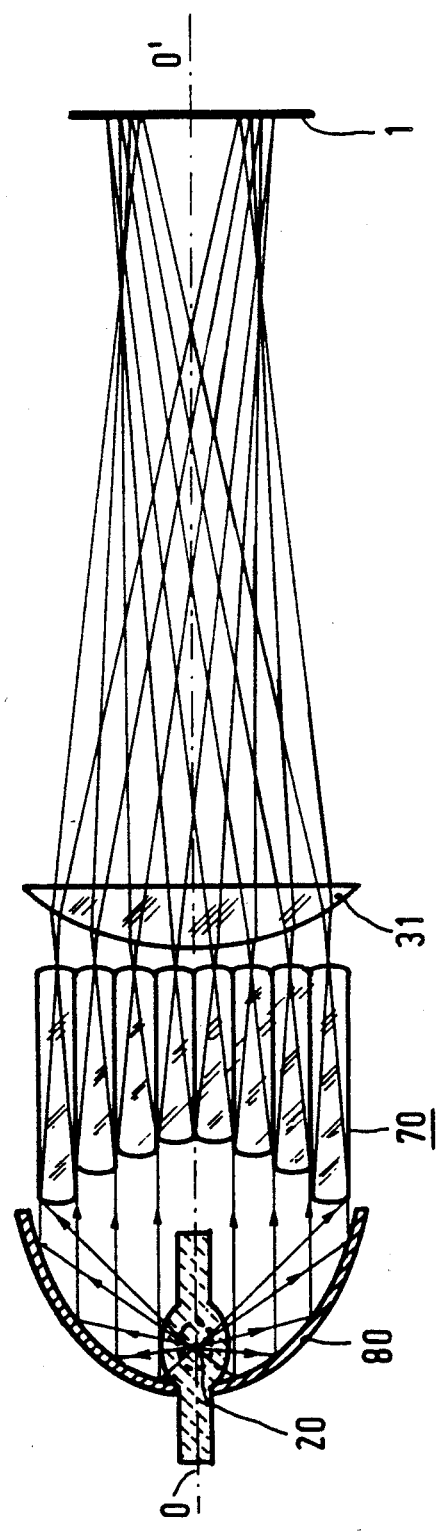
FIG. 22 shows an embodiment of the illumination system with a parabolic reflector and a lens plate adapted to obtain a special distribution of illumination intensity.

FIG. 22 shows an embodiment of an illumination system with a parabolic reflector 80 and a composite lens plate 70 with which the intensity distribution on the display panel 1 can be adapted. The lens plate which is composed of a number of transparent rods having lens surfaces at their front and rear sides functions in the same way as has been described with reference to FIG. 19. The combination of a parabolic reflector and the lens plate 70 provides the additional advantage that the numerical aperture of the parabola, which is smaller at the edge, corresponds to that of the lens plate, so that a larger efficiency is obtained while the throughput remains the same. Moreover, the illumination system may be given a more compact shape because a portion of the lamp projects into the cavity of the lens plate.

Figure 23:
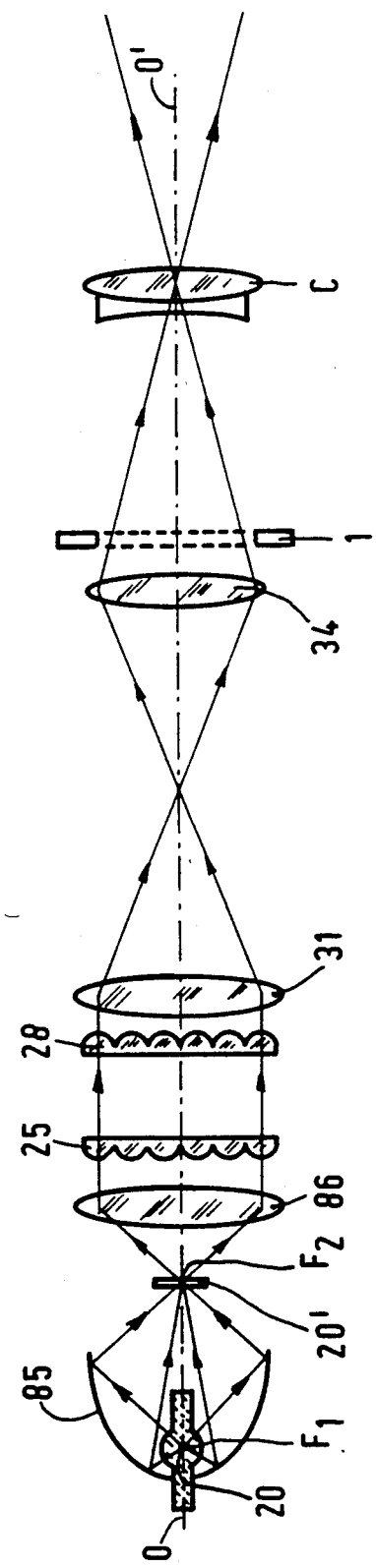
FIGS. 23, 24 and 25 show embodiments of the illumination system with an elliptic reflector around the radiation source.

FIG. 23 shows an illumination system of the same type as that of FIG. 20, but in this system the parabolic reflector is replaced by an elliptic reflector 85 and an extra lens 86. The radiation source 20 is, for example, again an elongated lamp whose longitudinal direction coincides with the optical axis OO'. This source is arranged in the first focal point $F_1$ of the elliptic reflector. The reflector forms an image 20' in the second focal point $F_2$. The lens 86 collimates the radiation from the source 20 and the image 20' to a parallel beam so that the lenses of the plate 25 have the same width and height as those of the plate 28.

Figure 24:
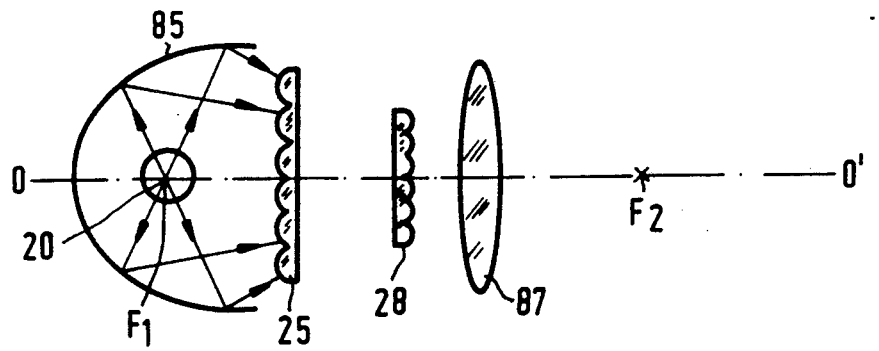

It is alternatively possible to arrange the first lens plate in the path of the coverging beam coming from the reflector 85, as is shown in FIG. 24. The width and height of the lenses of the plate 25 are then larger than those of the lenses of the plate 28. A lens 87 to correct for the convergence of the beam incident on the plates is now arranged behind the second lens plate.

Figure 25:
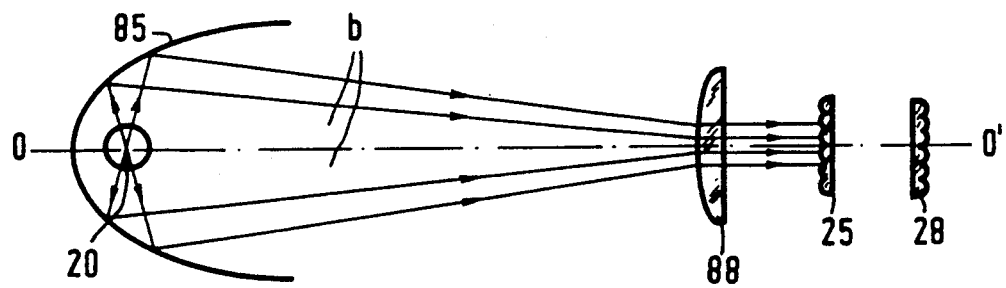

When using an elliptic reflector it may also be ensured that an image of the source is formed on the first lens plate. FIG. 25 shows an embodiment in which this is the case. The lens plates 25, 28 may then have smaller dimensions. A lens 88 rendering the beam b telecentric so that all rays of the beam are perpendicularly incident on the first lens plate 25 may be arranged in front of this lens plate.

Figure 26:
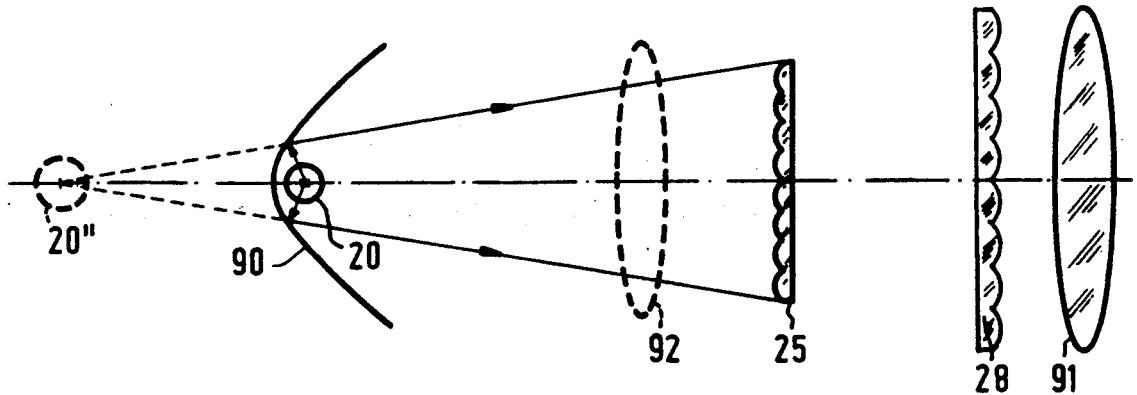
FIG. 26 shows an embodiment of the illumination system with a hyperbolic reflector.

A further embodiment of an illumination system of the same type as that in FIGS. 20 and 23 is shown in FIG. 26. In this embodiment the reflector 90 is hyperbolic. This reflector concentrates the radiation from the source 20 to a diverging beam, which seems to be coming from the virtual source image 20" at the left of the reflector. As is shown in FIG. 26, the first lens plate 25 may be arranged in the path of this diverging beam, the lenses of the first lens plate 25 having a smaller width and height than those of the second lens plate 28. A lens 91 to compensate for the divergence of the beam is arranged behind the second lens plate. It is alternatively possible to arrange a lens 92 between the hyperbolic reflector and the first lens plate so as to convert the beam coming from the reflector to a parallel beam. The lenses of the first and second lens plates may then again have equal widths and heights.

FIG. 27 shows a modification of the illumination system according to FIGS. 20 and 21 in which a larger radiation source 20 can be used, while the numerical aperture of the projection lens can nevertheless remain limited. This is achieved by giving the lenses 29 of the second lens plate 28 such a shape that the differently oriented radiation spots 81 formed on these lenses fill these lenses as satisfactorily as possible. It has further been ensured that these lenses engage each other and that their joint surface is approximately circular. As is shown in FIG. 27, the lenses 29 have a hexagonal shape and are arranged in a honeycomb configuration. Unlike the embodiment described hereinbefore, the lenses 29 of the plate in the illumination system according to FIG. 27 are arranged in a configuration which is different from that of the lenses 26 of the plate 25.

FIG. 28 shows an alternative embodiment of the lens plate 28 in a front elevational view. The surfaces of the lenses 29 now have the shape of an equilateral triangle so that the differently oriented radiation spots fit therein to an equal extent. The plate 28 of FIG. 28 comprises a larger number of lenses than the plate 28 of FIG. 27, namely thirty-eight instead of eighteen. On the one hand a larger number of lenses results in a better uniformity of the illumination of the object, the display panel 1, but on the other hand more radiation will be diffracted because there are more lens edges. In practice the choice of the number of lenses per plate will be a compromise between the admissible diffraction and the desired uniformity of the illumination.

FIG. 29 shows a further embodiment of an illumination system having an elongate radiation source 20, whose longitudinal direction is parallel to the optical axis OO', and a parabolic reflector 80. The surfaces of the lenses 29 of the second lens plate 28 now have the shape of segments of a circle, resulting in an optimum adaptation to the entrance pupil of the projection lens system C. The configuration of the lenses 29 in the plate 28 is completely different from that of the lenses 26 in the plate 25. The lens $29_1$ is conjugated to the lens $26_1$, the lens $29_2$ is conjugated to the lens $26_2$, and so forth. The lenses 26 are of course designed in such a way that the principal axes of the sub-beams passing through them are directed towards the centers of the lenses $29_1$–$29_{10}$.

The cross-sections of the lenses 29 may be alternatively segments of a ring. These lenses may then be arranged in one ring, in two rings, as is shown in FIG. 30, or in a plurality of rings.

As is shown in FIG. 31, the lens plate may alternatively comprise a set of lenses having cross-sections which are segments of a circle, as well as a set of lenses having cross-sections which are segments of a ring.

In all embodiments shown the lenses of both the first lens plate 25 and of the second lens plate may have aspherical lens surfaces.

In the illumination systems shown in FIGS. 27, 28 and 29 the parabolic reflector 80 may be replaced by an elliptic reflector 85 or by a hyperbolic reflector 90 as shown in FIGS. 25 and 26.

Figure 32:
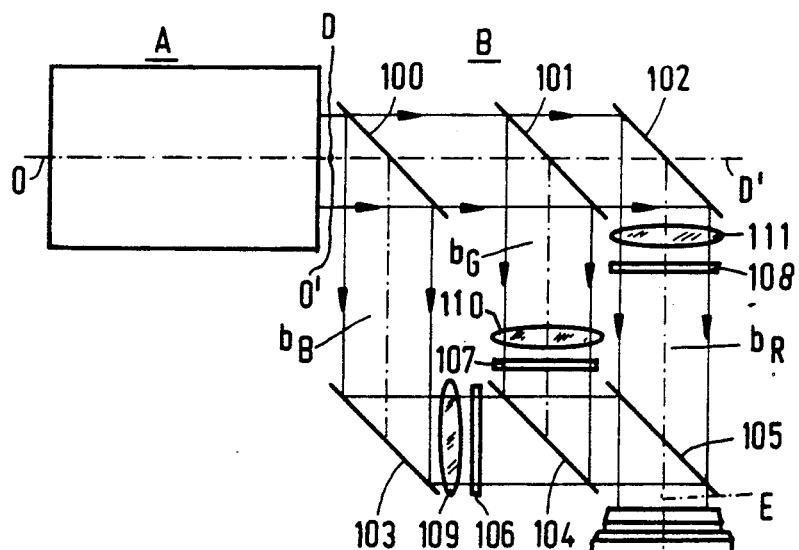
FIGS. 32, 33 and 34 show first, second and third embodiments of a color image projection apparatus in which the illumination system can be used.

FIG. 32 shows diagrammatically an embodiment of a color projection television apparatus. This apparatus comprises three main sections: the illumination system A, the display system B and a projection lens system C, for example, a zoom lens. The principal axis OO' of the illumination system is in alignment with the optical axis DD' of the apparatus, which is firstly divided into three sub-axes in the embodiment shown, which sub-axes are combined at a later stage to one optical axis coinciding with the optical axis EE' of the projection lens system.

The beam from the illumination system A is incident on a color-selective reflector 100, for example, a dichroic mirror which reflects, for example the blue color component $b_B$ and passes the rest of the beam. This beam portion reaches a second color-selective reflector 101 which reflects the green color component $b_G$ and passes the remaining red color component $b_R$ to a reflector 102 which reflects the red beam to the projection lens system. The reflector 102 may be a neutral reflector or a reflector which is optimised for red light. The blue beam is reflected by a neutral or blue-selective reflector 103 to a display panel 106 in the form of a liquid crystal panel. This panel is electronically driven in known manner so that the blue component of the image to be projected appears on this panel. The beam modulated with the blue information reaches the projection lens system C via a color-selective reflector 104, which passes the blue beam and reflects the green beam, and a further color-selective reflector 105 which reflects the blue beam. The green beam $b_G$ transverses a second display panel 107 where it is modulated with the green color component and is then reflected to the projection lens system C successively by the color-selective reflectors 104 and 105. The red beam $b_R$ transverses a third display panel 108 where it is modulated with the red color component and subsequently it reaches the projection lens system via the color-selective reflector 105.

The blue, red and green beams are superimposed at the input of the projection lens system so that a color image is created at this input which is imaged in a magnified form by this system on a projection screen, which is not shown in FIG. 32.

The optical path lengths between the output of the illumination system A and each display panel 106, 107 and 108 are preferably equal so that the cross-sections of the beams $b_B$, $b_G$ and $b_R$ are equal at the location of their display panel. Also the optical path lengths between the display panels 106, 107 and 108 and the input aperture of the projection lens system are preferably equal so that the differently colored scenes are satisfactorily superimposed on the projection screen.

Each lens 109, 110 and 111 arranged in front of the display panels 106, 107 and 108 corresponds to the lens 34 of FIGS. 2, 20, 23, 27 and 29 and ensures that all radiation coming from the exit plane of the illumination system is concentrated in the entrance pupil of the projection lens system C.

Figure 33:
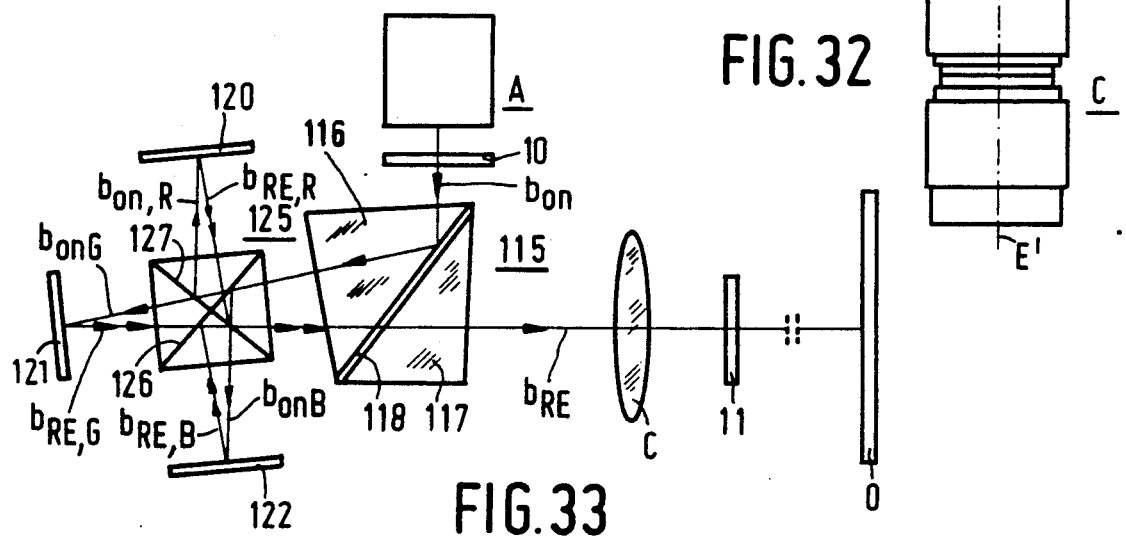

FIG. 33 shows an embodiment of a colour image projection apparatus with reflecting display panels 120, 121 and 122. The beam b supplied by the illumination system according to the invention is split up into three differently colored beams $b_R$, $b_G$ and $b_B$ by a so-called dichroic cross 125 constituted by two dichroic mirrors 126 and 127.

The projection lens system C, illustrated by a single lens in this Figure, should only collect radiation of the beam $b_{RE}$ reflected by the display panels and no radiation of the beam $b_{ON}$ supplied by the illumination system.

In order to ensure that the beams $b_{ON}$ and $b_{RE}$ are sufficiently separated at the position of the projection lens system without the distance between this system and the display panel having to be large, use is made of an angle-dependent beam separator in the form of a composite system of prisms 115. This system comprises two transparent prisms 116 and 117 of glass or a synthetic material between which a layer of air 118 is present. Since the refractive index $n_m$ of the prism material ($n_m$ is, for example 1.5) is larger than the index $n_l$ of air ($n_l = 1.0$), a radiation beam which is incident on the interface between the prism and air at an angle $\theta_i$ which is larger than or equal to the so-called critical angle $\theta_g$ for which it holds that $$\sin \theta_g = \frac{n_l}{n_m}$$

will be totally reflected. A beam which is incident on the interface at an angle which is smaller than the critical angle is completely transmitted. In the embodiment according to FIG. 33 the refractive index of the prisms 116 and 117 and the orientation of the air layer 118 are chosen to be such that the beam $b_{ON}$ coming from the illumination system A is totally reflected by the interface 116, 118 towards the display system and that the beam $b_{RE}$ coming from this system is completely passed by this interface. For this purpose the angle of incidence of the beam $b_{ON}$ and the beam $b_{RE}$ on the interface is larger and smaller, respectively, than the critical angle.

The system of prisms ensures that the chief ray of the beam $b_{RE}$ extends at a large angle, which may be proximate to 90°, to that of the beam $b_{ON}$. Consequently the projection lens system C can be arranged close to the display system so that the length of the image projection device can be considerably shorter than in the absence of the system of prisms.

It is also possible to choose the orientation of the interface 116, 118 with respect to the directions of the beams $b_{ON}$ and $b_{RE}$ in such a way that the beam $b_{ON}$ is passed on to the display system, which is then arranged below the system of prisms and that the beam $b_{RE}$ is reflected to the projection lens system C. In the case of color beam projection the latter arrangement provides the advantage that fewer color aberrations occur in the modulated beam $b_{RE}$.

In FIG. 33 the beam $b_{ON}$ reflected by the interface 116, 118 is incident on a first dichroic mirror 126 which reflects, for example blue light. The blue component $b_{ON,B}$ is incident on the display panel 122 in which the blue sub-image is generated and the beam $b_{RE,B}$ modulated with the blue image information is reflected to the dichroic cross 125 by the panel 122. The beam having a read and a green component passed by the dichroic mirror 126 is incident on the second dichroic mirror 127 which reflects the red component $b_{ON,R}$ to the display panel 120. The red sub-image is generated in this panel. The beam $b_{RE,R}$ modulated with the red image information is reflected to the dichroic cross 125. The green beam component $b_{ON,G}$ passed by the mirror 127 is modulated by the green display panel 121 and reflected as beam component $b_{RE,G}$ to the dichroic cross 125. Since the dichroic mirrors 126 and 127 reflect the returning beam components $b_{RE,B}$ and $b_{RE,R}$ and pass the beam component $b_{RE,G}$, these beam components are combined to one beam $b_{RE}$ which is modulated with the color image information.

The polarizer 10 and the analyser 11 are preferably arranged between the illumination system A and the display system, and between the display system and the projection lens system respectively so that these elements simultaneously act on the three colour components and a separate system of such elements is not necessary for each color component.

A directly driven reflective liquid crystal display panel is described in, inter alia U.S. Pat. No. 4,239,346.

The color image projection apparatus may alternatively comprise a display system having only one display panel, namely a composite or color panel, instead of a display system with three monochrome panels. This color panel then comprises a number of pixels which is, for example, three times as large as the number of pixels of a monochrome panel. The pixels of the color panel are arranged in three groups with which a red, a green and a blue sub-image is generated. A pixel of each of the groups is conjugated to a pixel on the projection screen. A separate color filter is then arranged, for example in front of each pixel, which filter only passes the colour desired for the relevant pixel.

The color panel may be a transmission panel in which the colour image projection apparatus may have a construction as is shown in FIGS. 1, 2, 20, 23, 27 and 29. If the color panel is a reflective panel, the color image projection apparatus may have a construction as is shown, for example in FIG. 31 in which the colour panel is arranged at the position of the monochrome panel 121 and the panels 120 and 122, as well as the dichroic cross 125, have been omitted.

Figure 34:
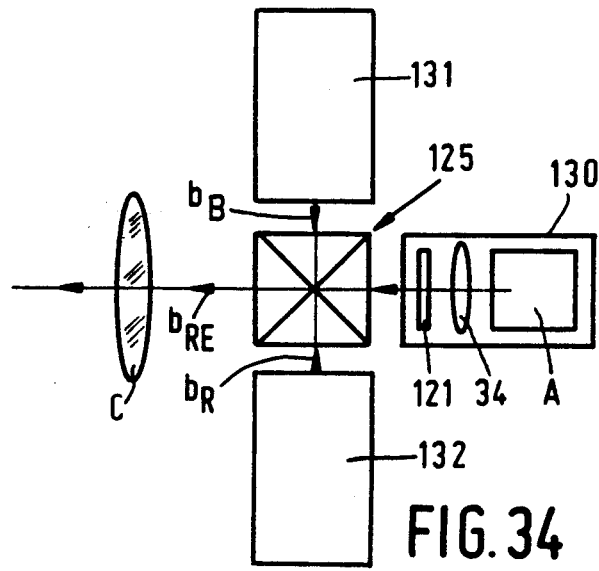

FIG. 34 is a diagrammatic plan view of a colour image projection device using three color channels 130, 131 and 132 for the primary colors green, blue and red, respectively. Each color channel comprises an illumination system A according to the invention, a lens 34 and a transmission display panel 121. These elements are shown in the green channel 130. Corresponding elements are arranged in the same manner in the other channels. The differently colored beams $b_G$, $b_B$ and $b_R$ modulated with the image information are combined to one beam $b_{RE}$ by, for example a dichroic cross 125, which beam is projected on a display screen (not shown) by the projection lens system C.

The illumination system according to the invention may not only be used for illuminating a liquid crystal display panel, but also for illuminating a display system using a cathode ray tube in combination with a photo conducting layer and a layer of liquid crystalline material, which display system is described in U.S. Pat. No. 4,127,322.

The invention may generally be used in those cases where a non-round object must be illuminated and where very efficient use should be made of the radiation supplied by a radiation source.

We claim:

1. An illumination system for supplying an optical radiation beam along a principal axis and intended for illuminating an object which, in a plane perpendicular to the principal axis, has a non-round cross-section, said system comprising a radiation source, a concave reflector for concentrating radiation emitted by the radiation source and a lens system arranged in the path of the concentrated radiation, characterized in that the lens system successively comprises a first lens plate provided with a plurality of first lenses which, in a plane perpendicular to the principal axis, have a uniform width in a first direction and a uniform height in a second direction perpendicular to the first direction, a second lens plate provided with a plurality of second lenses whose number is proportional to the number of first lenses and a third lens, the first lens plate dividing a radiation beam incident thereon into a number of sub-beams propositional to the number of first lenses, which sub-beams have their smallest constriction in the plane of the second lenses and whose chief rays are directed towards the centers of the corresponding second lenses, in that the third lens together with the second lens plate images the radiation spots formed on the first lens plate in a superimposed form on the object, and in that the width/height ratio of the first lenses corresponds to said ratio of the object cross-section in that the shape, in the plane of the second lens plate, of each of the second lenses is adapted to the cross-section, in this plane of the sub-beam belonging to the second lens and in that the second lenses are arranged such that the circumference of their total surface in said plane is substantially a circle of minimum diameter.

2. An illumination system as claimed in claim 1, characterized in that the third lens is integrated with the second lens plate.

3. An illumination system as claimed in claim 1, characterized in that the lenses of at least one of the lens plates are aspherical.

4. An illumination system as claimed in claim 1, characterized in that the number of second lenses is twice the number of first lenses.

5. An illumination system as claimed in claim 1, characterized in that the first lenses have such a size and are arranged in such a way that the surface of the first lens plate is approximately equal to the cross-section of the radiation beam incident.

6. An illumination system as claimed in claim 1, characterized in that the radiation beam incident on the first lens plate is a diverging beam and in that the width and height of the first lenses are smaller than those of the second lenses.

7. An illumination system as claimed in claim 1, characterized in that the beam incident on the first lens plate is a converging beam and in that the width and height of the first lenses are larger than those of the second lenses.

8. An illumination system as claimed in claim 1, characterized in that the first lens plate is arranged in a plane in which a first image of the radiation source is formed and in that said image is re-imaged on the object by the lens plates and the subsequent lens.

9. An illumination system as claimed in claim 1, characterized in that the two lens plates are integrated in one plate having two outer surfaces one of which supports the matrix of first lenses and the other supports the matrix of second lenses.

10. An illumination system as claimed in claim 1 or 9, characterized in that a lens plate has a curved surface such that the pairs of associated first and second lenses have different distances between the first and second lenses.

11. An illumination system as claimed in claim 9, characterized in that each pair of associated first and second lenses forms part of a transparent rod having curved entrance and exit faces.

12. An illumination system as claimed in claim 1, characterized in that at least one of the lens plates, together with an associated lens, is integrated in one optical element having at least one curved surface.

13. An illumination system as claimed in claim 12 in which the associated lens is planoconvex, characterized in that the matrix of lenses is arranged on the flat refractive surface of the lens.

14. An illumination system as claimed in claim 12 or 13, characterized in that the matrix of lenses is arranged on a curved refractive surface of the lens.

15. An illumination system as claimed in claim 12 or 13, characterized in that a curved refractive surface of the lens is replaced by a principally flat surface on which a matrix of lenses is arranged each having a curvature which is related to the curvature, at the location of the relevant matrix lens, of the original curved refractive surface.

16. An illumination system as claimed in claim 1, characterized in that the reflector is a spherical reflector which only collects radiation emitted by the source at one side of the plane through the center of the radiation source and perpendicular to the optical axis of the system, and in that a condensor lens system is arranged at the other side of said plane and in front of the first lens plate.

17. An illumination system as claimed in claim 1, characterized in that the reflector is a spherical reflector which only collects radiation emitted by the source at one side of a plane through the center of the radiation source and perpendicular to the optical axis of the system, and in that two condensor lens systems are arranged at the other side of said plane, each system collecting a different part of the radiation from the radiation source and from the reflector.

18. An illumination system as claimed in claim 16 or 17, in which the radiation source is elongated, characterized in that the longitudinal direction of the radiation source is parallel to the principal axis.

19. An illumination system as claimed in claim 16 or 17, characterized in that each condensor lens system comprises one lens at least one refractive surface of which is aspherical.

20. An illumination system as claimed in claim 16 or 17, characterized in that each condensor lens system comprises a single main condensor lens which is succeeded by at least one extra lens element.

21. An illumination system as claimed in claim 17, characterized in that the first lens plate is divided into two first lens plates which are arranged in the first and the second condensor lens system, respectively.

22. An illumination system as claimed in claim 1, characterized in that the reflector is a parabolic reflector which surrounds the greater part of the radiation source.

23. An illumination system as claimed in claim 1, characterized in that the reflector is a hyperbolic reflector which surrounds the greater part of the radiation source.

24. An illumination system as claimed in claim 23, characterized in that a collimator lens is arranged between the reflector and the first lens plate.

25. An illumination system as claimed in claim 22, 23 or 24, characterized in that the width and height of the lenses of the second lens plate are larger than the width and height of the images formed on said lenses.

26. An illumination system as claimed in claim 22, 30 or 31 in which the radiation source is elongated, characterized in that the longitudinal direction of the radiation source is parallel to the principal axis.

27. An illumination system as claimed in claim 26, characterized in that the cross-section, in a plane perpendicular to the principal axis, of the second lenses is a 3n polygon in which n=1, 2, etc., the outer sides of the outer lenses approximately following the local curvature of a circumscribed circle, and at least two sides of each outer lens and all sides of all other lenses engaging sides of adjoining lenses.

28. An illumination system as claimed in claim 27, characterized in that the cross-sections of the second lenses are hexagons.

29. An illumination system as claimed in claim 26, characterized in that the cross-sections of the second lenses are segments of a circle, in that said lenses engage each other and in that the second lens plate is round.

30. An illumination system as claimed in claim 26, characterized in that the cross-sections of the second lenses are segments of a ring, in that said lenses engage each other and in that the second lens plate is round.

31. An illumination system as claimed in claim 20, characterized in that the second lenses are arranged in at least two rings.

32. An illumination system as claimed in claim 26, characterized in that the second lens plate comprises a first set of lenses whose cross-sections are segments of a circle and a second set of lenses whose cross-sections are segments of a ring and which are arranged in at least one ring.

33. An image projection apparatus comprising successively an illumination system, an information display system having at least one display panel for generating images to be projected and a projection lens system for projecting said images on a screen, characterized in that the illumination system is a system as claimed in claim 1 and in that a lens for imaging the exit pupil of the illumination system on the entrance pupil of the projection lens system is arranged in the radiation path in front of and proximate to the display panel.

34. A colour image projection apparatus having three colour channels for the three primary colours red, green and blue, each colour channel comprising a separate display panel, characterized in that it comprises one illumination system as claimed in claim 1 39 for supplying separate beams for the three colour channels via colour-splitting means.

35. A colour image projection apparatus having three colour channels for the three primary colours red, green and blue, each channel comprising a separate display panel, characterized in that each colour channel comprises a separate illumination system as claimed in claim 1.

* * * * *